US012776551B2

(12) United States Patent
Zhu et al.

(10) Patent No.: US 12,776,551 B2
(45) Date of Patent: Oct. 27, 2026

(54) BATTERY, BATTERY MODULE, BATTERY PACK, AND AUTOMOBILE

(71) Applicant: BYD COMPANY LIMITED, Shenzhen (CN)

(72) Inventors: Jianhua Zhu, Shenzhen (CN); Yan Zhu, Shenzhen (CN); Xinyue Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 444 days.

(21) Appl. No.: 17/778,799

(22) PCT Filed: Nov. 19, 2020

(86) PCT No.: PCT/CN2020/130026
§ 371 (c)(1),
(2) Date: May 20, 2022

(87) PCT Pub. No.: WO2021/098762
PCT Pub. Date: May 27, 2021

(65) Prior Publication Data

US 2022/0407186 A1 Dec. 22, 2022

(30) Foreign Application Priority Data

Nov. 22, 2019 (CN) ......................... 201911158896.5

(51) Int. Cl.
*H01M 50/474* (2021.01)
*H01M 50/112* (2021.01)
(Continued)

(52) U.S. Cl.
CPC ....... *H01M 50/474* (2021.01); *H01M 50/112* (2021.01); *H01M 50/148* (2021.01);
(Continued)

(58) Field of Classification Search
CPC . Y02E 60/10; Y10T 29/491; Y10T 29/49108; Y02P 70/50; H01M 6/42;
(Continued)

(56) References Cited

U.S. PATENT DOCUMENTS

2003/0077508 A1* 4/2003 Asahina .............. H01M 50/103 429/153
2006/0166087 A1* 7/2006 Ogata ............... H01M 10/0413 429/153
(Continued)

FOREIGN PATENT DOCUMENTS

CN 2852411 Y 12/2006
CN 201781031 U 3/2011
(Continued)

OTHER PUBLICATIONS

CN-205992559-U—English Translation via Espacenet (Year: 2024).*
(Continued)

*Primary Examiner* — Allison Bourke
*Assistant Examiner* — Bethany C Garcia
(74) *Attorney, Agent, or Firm* — Sheppard Mullin Richter & Hampton LLP

(57) ABSTRACT

A battery is provided. The battery includes: a housing and a plurality of accommodating cavities provided in the housing. Two adjacent accommodating cavities are separated by a partition plate. An electrode core assembly is arranged in each of the accommodating cavities. A plurality of electrode core assemblies are sequentially arranged along the first direction and connected in series. A spacer is arranged between the end of the electrode core assembly along the first direction and the partition plate.

21 Claims, 15 Drawing Sheets

(51) Int. Cl.
*H01M 50/148* (2021.01)
*H01M 50/204* (2021.01)
*H01M 50/477* (2021.01)
*H01M 50/531* (2021.01)
*H01M 50/636* (2021.01)

(52) U.S. Cl.
CPC ....... *H01M 50/204* (2021.01); *H01M 50/477* (2021.01); *H01M 50/531* (2021.01); *H01M 50/636* (2021.01); *H01M 2220/20* (2013.01)

(58) Field of Classification Search
CPC ........... H01M 10/0413; H01M 10/345; H01M 10/0643; H01M 50/54; H01M 50/16; H01M 10/6557; H01M 2220/20; H01M 50/60–645; H01M 50/668; H01M 50/682; H01M 50/691; H01M 50/20; H01M 50/40; H01M 50/655; B60L 50/60
See application file for complete search history.

(56) References Cited

U.S. PATENT DOCUMENTS

| | | | | |
|---|---|---|---|---|
| 2011/0104540 | A1* | 5/2011 | Lee | H01M 10/0431 429/94 |
| 2011/0177376 | A1 | 7/2011 | Maguire | |
| 2011/0300437 | A1* | 12/2011 | Yi | H01M 50/645 429/185 |
| 2014/0063692 | A1 | 3/2014 | Tan et al. | |
| 2015/0010833 | A1* | 1/2015 | Amendola | H01M 4/38 429/405 |
| 2015/0030908 | A1 | 1/2015 | Wang et al. | |
| 2015/0283965 | A1* | 10/2015 | Lynds | H01M 10/613 361/434 |
| 2017/0149047 | A1* | 5/2017 | Guen | H01M 50/176 |
| 2017/0187027 | A1* | 6/2017 | Ono | H01M 50/636 |

FOREIGN PATENT DOCUMENTS

| | | | | |
|---|---|---|---|---|
| CN | 102104167 | A | * | 6/2011 |
| CN | 202127045 | U | | 1/2012 |
| CN | 102683755 | A | | 9/2012 |
| CN | 103647112 | A | | 3/2014 |
| CN | 205992559 | U | * | 3/2017 |
| CN | 207116600 | U | | 3/2018 |
| CN | 208298914 | U | | 12/2018 |
| CN | 208298915 | U | | 12/2018 |
| CN | 110518156 | A | | 11/2019 |
| CN | 211743203 | U | | 10/2020 |
| CN | 211743281 | U | | 10/2020 |
| EP | 1705731 | A1 | | 9/2006 |
| JP | S60109168 | S | | 6/1985 |
| JP | H0636751 | A | | 2/1994 |
| JP | 06-044022 | U | | 6/1994 |
| JP | 2000090961 | A | | 3/2000 |
| JP | 2003068257 | A | | 3/2003 |
| JP | 2006-209986 | A | | 8/2006 |
| JP | 2006252821 | A | | 9/2006 |
| JP | 2015191770 | A | | 11/2015 |
| JP | 2016046113 | A | | 4/2016 |
| JP | 2016110790 | A | | 6/2016 |
| JP | 2019164970 | A | | 9/2019 |

OTHER PUBLICATIONS

CN-102104167-A—English Translation via Espacenet (Year: 2024).*
International Search Report and Written Opinion for Application No. PCT/CN2020/130026, mailed on Feb. 20, 2021, 13 pages.

* cited by examiner

BATTERY, BATTERY MODULE, BATTERY PACK, AND AUTOMOBILE

CROSS-REFERENCE TO RELATED APPLICATIONS

This application is a National Phase Application of International Patent Application No. PCT/CN2020/130026, filed on Nov. 19, 2020, which is based on and claims priority to and benefits of Chinese Patent Application No. 201911158896.5, filed by BYD Company Limited on Nov. 22, 2019 and entitled "BATTERY, BATTERY MODULE, BATTERY PACK, AND AUTOMOBILE". The entire content of the above-referenced applications is incorporated herein by reference.

FIELD

This application relates to the technical field of batteries, and in particular, to a battery, a battery module, a battery pack, and a vehicle.

BACKGROUND

The progressive popularization of new energy vehicles poses higher requirements for power batteries to be used in the new energy vehicles. Particularly, an increasingly higher mile range of the new energy vehicles required by users makes it necessary to continuously increase the overall capacity of a battery pack to be used in a new energy vehicle. In addition, during the operation of a power battery pack, an internal consumption caused by an internal resistance needs to be minimized.

An existing new energy vehicle is generally at least 1 meter in width and several meters in length. The power battery pack of the new energy vehicle is generally arranged at the bottom of the new energy vehicle. The width of the power battery pack currently available in the market generally has the same direction as the width of the new energy vehicle, and is at least 1 meter or so. The length of the power battery pack is determined by the space reserved at the bottom of the new energy vehicle, and is generally at least 2 meters. Overall, the power battery pack is more than 1 meter in both length and width. The length of an individual cell currently available in the market is generally approximately 0.3 meters. Therefore, three or more cells need to be arranged side by side in the power battery pack.

For each of a plurality of cells arranged side by side, a fixing structure needs to be added. In addition, a power connection needs to be formed between two adjacent cells by a peripheral power connector. This disposition leads to a relatively large number of cell mounting structures, which increases not only the cost, but also the overall weight. In addition, the mounting structures occupy much internal space inside a cell pack, causing the overall capacity of the power battery pack to decrease. The larger number of the cells arranged side by side results in more space wasting. In addition, several external power connectors need to be arranged for power connection, thereby increasing the internal resistance, and in turn, increasing the internal consumption of the power battery pack in use.

SUMMARY

The application aims to solve at least one of technical problems in the related art. To achieve the foregoing objective, this application discloses a battery, an electrode core assembly of the battery with better stability of position, low cost and more reasonable space occupation.

A battery is provided, including: a housing and a plurality of accommodating cavities provided in the housing. Two adjacent accommodating cavities are separated by a partition plate. An electrode core assembly is arranged in each accommodating cavity. A plurality of electrode core assemblies are sequentially arranged along the first direction and connected in series. A spacer is arranged between the end of the electrode core assembly along the first direction and the partition plate.

Therefore, a plurality of spaced accommodating cavities are formed by the housing together with the partition plate, so that an electrode core assembly can be arranged in each accommodating cavity to form a cell. Because the accommodating cavity is formed by the housing together with the partition plate, no fixing structure needs to be added for each cell, thereby effectively reducing cost and occupied space. In addition, in this application, the electrode core assembly can be tightly fixed by the end of the electrode core assembly along the first direction and the partition plate, thereby improving the positional firmness of the electrode core assembly in the accommodating cavity.

A battery module is provided, including a plurality of batteries according to this application.

A battery pack is provided, including a plurality of batteries according to this application or a plurality of battery modules according to this application.

A vehicle is provided, including the battery module according to this application or the battery pack according to this application.

Additional aspects and advantages of this application will be partly given in the following description, and a part thereof will become obvious in the following description or will be learned in the practice of this application.

BRIEF DESCRIPTION OF THE DRAWINGS

The above and/or additional aspects and advantages of this application will become obvious and easy to understand through embodiments described with reference with drawings outlined below.

DETAILED DESCRIPTION

Figure 1:
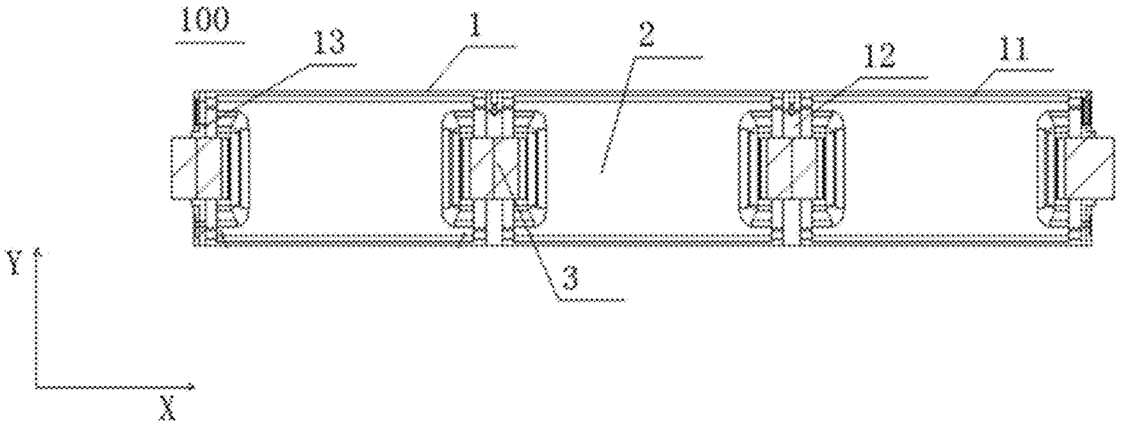
FIG. 1 is a cross-sectional schematic view of a battery according to an embodiment of this application.

The following describes embodiments of this application in detail. Examples of the embodiments are shown in the drawings, in which identical or similar reference numerals indicate identical or similar components or the components that serve identical or similar functions. The embodiments described below with reference to the drawings are exemplary, and are merely intended to construe this application but not intended to limit this application.

It is to be understood that, in the description of this application, a direction or positional relationship indicated by terms such as "center", "up", "down", "front", "back", "left", "right", "vertical", "horizontal", "top", "bottom", "in", and "out" is a direction or positional relationship based on illustrations in the drawings, and is merely intended for ease or brevity of description of this application, but does not necessarily mean or imply that the indicated device or component is provided in the specified direction or constructed or operated in the specified direction. Therefore, such terms are not to be understood as a limitation on this application.

It is to be noted that, the terms "first" and "second" are merely used for descriptive purposes but are not to be construed as indicating or implying relative importance or implicitly specifying the number of technical features indicated. Therefore, a feature qualified by "first" or "second" may explicitly or implicitly include one such feature or several such features. Further, unless otherwise specified in the description of this application, "a number of" means two or more.

The following describes a battery 100, a battery module 400, a battery pack 200, and a vehicle 1000 according to embodiments of this application with reference to FIG. 1 to FIG. 29.

A battery 100 is disclosed, which includes a housing 1 and a plurality of accommodating cavities 11 provided in the housing 1. Two adjacent accommodating cavities 11 are separated by a partition plate 12. An electrode core assembly 2 is arranged in each of the accommodating cavities 11. The electrode core assembly 2 includes at least one electrode core 201. A plurality of electrode core assemblies 2 are sequentially arranged along the first direction and connected in series. A spacer Q1 is arranged between the end of the electrode core assembly 2 along the first direction and the partition plate 12.

Compared with the related art, the beneficial effects of the application are as follows. A plurality of spaced accommodating cavities 11 are formed by the housing 1 together with the partition plate 12, so that an electrode core assembly 2 can be arranged in each accommodating cavity 11 to form an existing cell. Because the accommodating cavity 11 is formed by the housing 1 together with the partition plate 12, no fixing structure needs to be added for each cell, thereby effectively reducing cost and occupied space. In addition, in this application, the electrode core assembly 2 can be tightly fixed by the spacer Q1 arranged between the end along the first direction and the partition plate 12, thereby increasing the positional firmness of the electrode core assembly 2 in the accommodating cavity 11.

Figure 2:
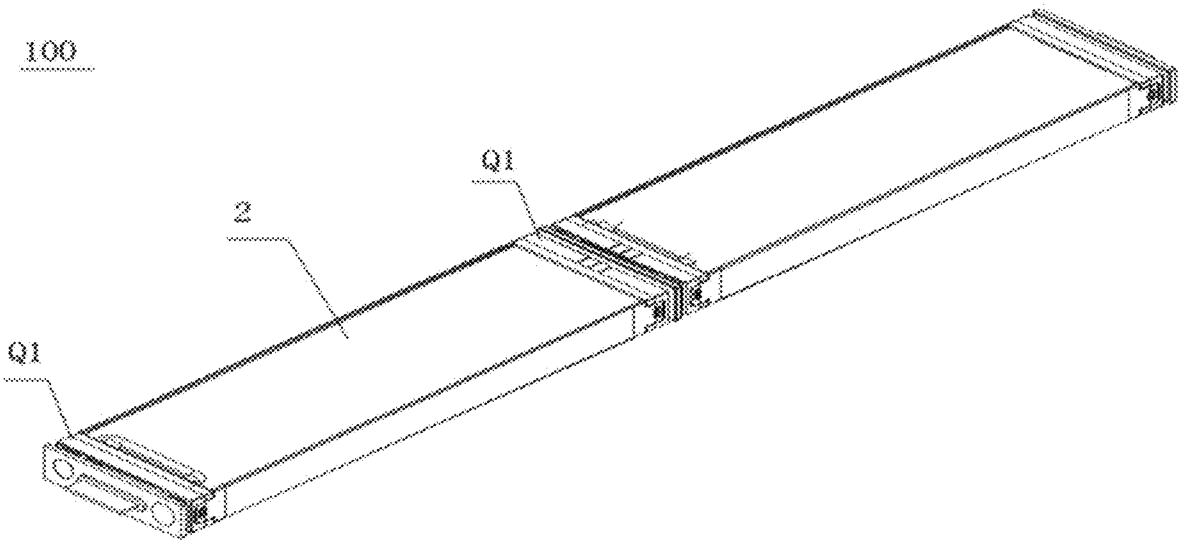
FIG. 2 is a schematic diagram of a plurality of series-connected electrode core assemblies of a battery.
Figure 3:
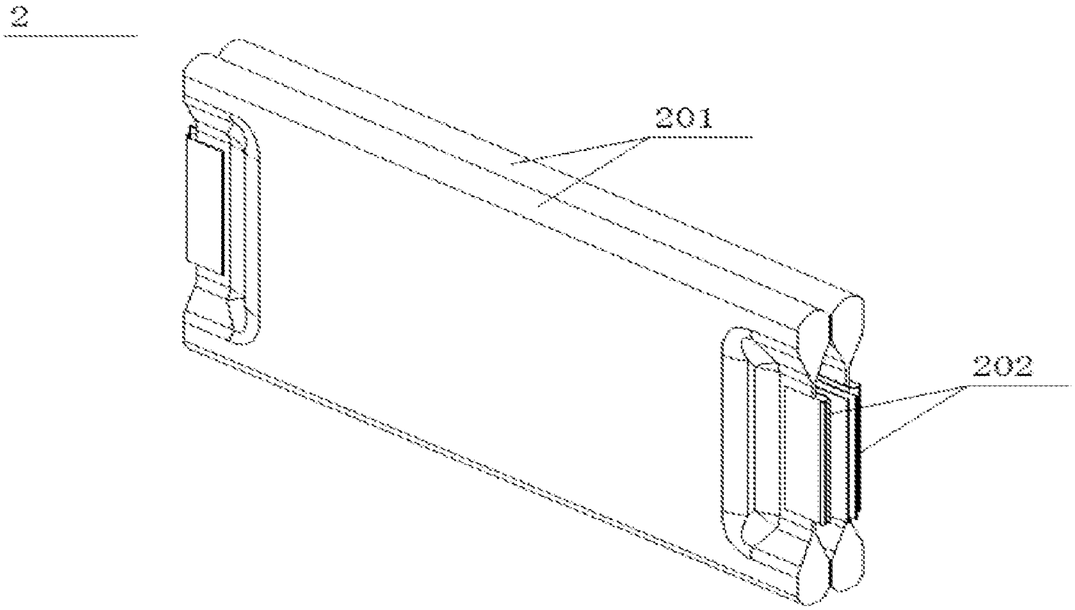
FIG. 3 is a schematic diagram of an internal structure of an electrode core assembly.

As shown in FIG. 1 to FIG. 3, FIG. 1 is a cross-sectional schematic view of a battery 100 according to an embodiment of this application. FIG. 2 is a schematic diagram of a plurality of series-connected electrode core assemblies 2 of a battery 100. FIG. 3 is a schematic diagram of an internal structure of an electrode core assembly 2. The battery 100 includes a housing 1 and electrode core assemblies 2. A plurality of accommodating cavities 11 are included in the housing 1, and two adjacent accommodating cavities 11 are separated by a partition plate 12. The electrode core assembly 2 is arranged in each accommodating cavity 11. The electrode core assembly 2 includes at least one electrode core 201. A plurality of electrode core assemblies 2 are sequentially arranged along the first direction and connected in series. A spacer Q1 is arranged between the end of the electrode core assembly 2 along the first direction and the partition plate 12. The spacers Q1 provided at two ends of the electrode core assembly 2 along the first direction limit the electrode core assembly 2 to a position inside the accommodating cavity 11 along the first direction.

It is to be understood that, as shown in FIG. 1, an end cover 13 is further arranged at the end of the housing 1 according to this application. The end cover 13 fits at the end of the housing 1 along the first direction. Therefore, the accommodating cavity 11 is defined by the space between the partition plate 12 and the end cover 13, and the space between two adjacent partition plates 12. The electrode core assembly 2 is arranged in each accommodating cavity 11, and the spacers Q1 are arranged at both ends of the electrode core assembly 2. Specifically, the spacer Q1 is arranged between each end of the electrode core assembly 2 and the partition plate 12 or end cover 13 adjacent to the end of the electrode core assembly 2. The electrode core assembly 2 is limited to a position inside the accommodating cavity 11 along the first direction. In this way, the spacer Q1 in this application increases the positional firmness of the electrode core assembly 2 in the accommodating cavity 11.

The end cover 13 is defined as an end cover plate that is parallel to the partition plate 12 and provided at the end of the housing 1 along the first direction for sealing the end.

In this application, the first direction is a left-right direction in FIG. 1, that is, an X direction shown in FIG. 1.

As shown in FIG. 1, the housing 1 is an integrated structure extending along the first direction. A plurality of partition plates 12 are arranged in the housing 1 at intervals. A lateral surface of each partition plate 12 fits with the housing 1 and an internal space of the housing 1 is divided into a plurality of accommodating cavities 11. A cavity wall of each accommodating cavity 11 includes the partition plate 12 or end cover 13 provided at the end of the accommodating cavity 11 and the housing 1 provided between two adjacent partition plates 12 or provided between the partition plate 12 and the end cover 13.

Specifically, a plurality of partition plates 12 are provided and the plurality of partition plates are arranged in the housing 1 at intervals. The lateral surface of the partition plate 12 fits with the housing 1 and the internal space of the housing 1 is divided into a plurality of accommodating cavities 11. The cavity wall of each accommodating cavity 11 includes the partition plate 12 provided at the end of the accommodating cavity 11 and the housing 1 provided between two adjacent partition plates 12. Alternatively, the cavity wall of the accommodating cavity 11 includes the end cover 13 provided at the end of the accommodating cavity 11 and the housing 1 provided between the partition plate 12 and the end cover 13.

It is to be noted that the plurality of accommodating cavities 11 include: an end accommodating cavity provided at the end of the battery 100 and defined by the end cover 13, the partition plate 12, and the housing 1; and a middle accommodating cavity defined by the two adjacent partition plates 12 and the housing 1. Specifically, the cavity wall of the middle accommodating cavity includes two adjacent partition plates 12 and the housing 1 provided between the two adjacent partition plates 12. The cavity wall of the end accommodating cavity includes the partition plate 12 adjacent to the end of the battery 100, the end cover 13, and the housing 1 provided between the partition plate 12 and the end cover 13.

At least one of the two ends of the housing 1 along the first direction is open. The end cover 13 is configured to seal an open end of the housing, so as to fit in with the housing 1 to form a closed structure.

In an embodiment in which one end of the housing 1 is open in the first direction, the cavity wall of one of the end sealing cavities is defined by a partition plate 12 and the housing 1, and the cavity wall of the other end sealing cavity is defined by a partition plate 12, the end cover 13, and the housing 1. In an embodiment in which both ends of the housing 1 in the first direction are open, the cavity wall of each of the two end sealing cavities is defined by a partition plate 12, the end cover 13, and the housing 1.

For example, both ends of the housing 1 along the first direction are open. The housing 1 may be a cylindrical structure. The end covers 13 are arranged at both ends of the housing along the first direction to seal openings at both ends of the housing 1.

The electrode core 201 mentioned in this application is an electrode core commonly used in the field of power batteries. The electrode core 201 and the electrode core assembly 2 are parts inside a housing of the battery 100, and are not meant to be the battery 100 itself. The electrode core 201 may be an electrode core 201 formed by winding, or an electrode core 201 made by stacking. Generally, the electrode core 201 includes at least a positive electrode plate, a separator, a negative electrode plate, and an electrolyte solution. Generally, the electrode core 201 means an assembly that is not fully sealed. Therefore, the battery referred to in this application is the battery 100, and is not to be simply understood as a battery module 400 or a battery pack because the battery includes a plurality of electrode cores 201. In this application, the electrode core assembly 2 may include a single electrode core 201, or may include at least two electrode cores 201. The at least two electrode cores 201 are connected in parallel to form the electrode core assembly 2. For example, two electrode cores 201 are connected in parallel to form the electrode core assembly 2, or four electrode cores 201 are connected in parallel to form the electrode core assembly 2.

Figure 4:
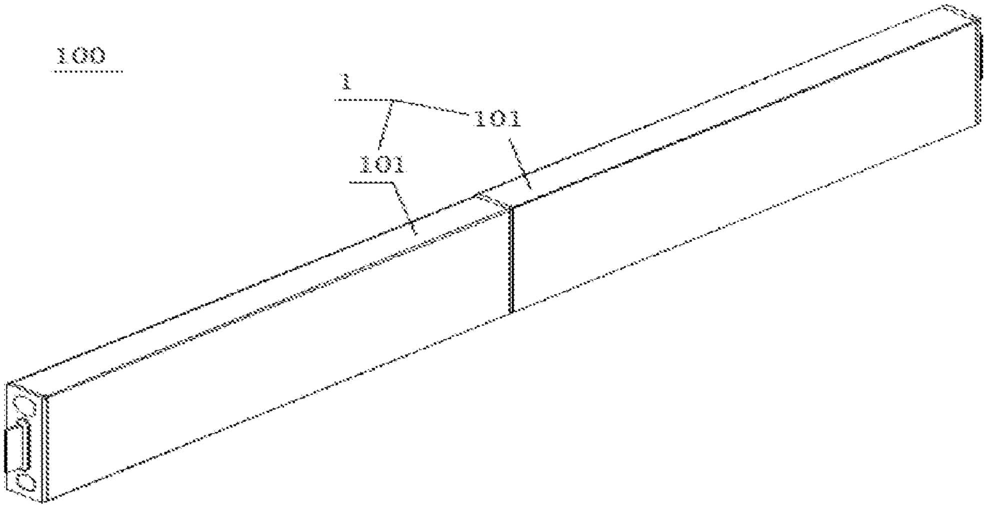
FIG. 4 is a schematic diagram of a battery according to another embodiment of this application.
Figure 5:
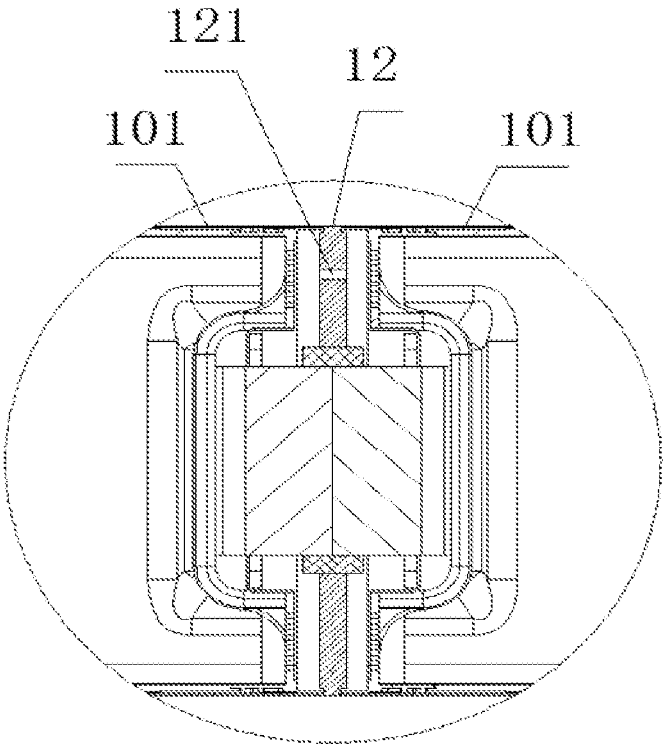
FIG. 5 is a cross-sectional schematic view of a partial region of a battery according to another embodiment of this application.

Referring to FIG. 4 and FIG. 5, FIG. 4 is a schematic diagram of another battery 100 according to an embodiment of this application, and FIG. 5 is a cross-sectional schematic view of a partial region of the battery 100 shown in FIG. 4. The housing 1 includes a plurality of sub-housings 101 arranged along the first direction. The partition plate 12 is connected to two adjacent sub-housings 101 concurrently. Two adjacent accommodating cavities 11 share a partition plate 12. A cavity wall of the accommodating cavity 11 includes the sub-housing 101 and the partition plate 12 or end cover 13 provided at the end of the sub-housing 101.

That is, the housing 1 is discontinuous along the first direction. Two adjacent sub-housings 101 share a partition plate 12 and extend to overlay a partial region of a circumferential sidewall of the partition plate 12. In this way, each sub-housing 101 fits in with the corresponding partition plate 12 and/or end cover 13 to form the accommodating cavity 11. As shown in FIG. 5, the two adjacent sub-housings 101 are spaced apart from each other. The circumferential sidewall of the partition plate 12 is exposed in a spacing region between the two adjacent sub-housings 101.

It is to be noted that, in an embodiment in which the housing 1 includes a plurality of sub-housings 101, the plurality of accommodating cavities 11 include: an end accommodating cavity that is provided at the end of the battery 100 and defined by the end cover 13, the partition plate 12, and the sub-housing 101; and a middle accommodating cavity defined by the partition plates 12 and the sub-housing 101. Specifically, the cavity wall of the middle accommodating cavity includes the partition plates 12 and the sub-housing 101. The cavity wall of the end accommodating cavity includes the partition plate 12 adjacent to the end of the battery 100, the end cover 13, and the sub-housing 101 provided between the partition plate 12 and the end cover 13.

In the embodiment shown in FIG. 4, at least one of the two outermost sub-housings 101 includes an opening opposite to the partition plate 12. The end cover 13 is arranged at the opening of the outermost sub-housing 101 along the first direction, and is configured to seal off the opening and fit in with the sub-housing 101 and the opposite partition plate 12 to form the accommodating cavity 11.

Specifically, the cavity wall of the end accommodating cavity corresponding to the outermost sub-housing 101 with an opening is defined by the partition plate 12, the end cover 13, and the sub-housing 101. The cavity wall of the end accommodating cavity corresponding to the outermost sub-housing 101 without an opening is defined by the partition plate 12 and the sub-housing 101.

In this embodiment, the housing 1 is a plurality of discontinuous sub-housings 101 to achieve the effect of looking like a cell in appearance, and is convenient to distinguish the position of each accommodating cavity 11, to facilitate management and maintenance of the battery.

Figure 6:
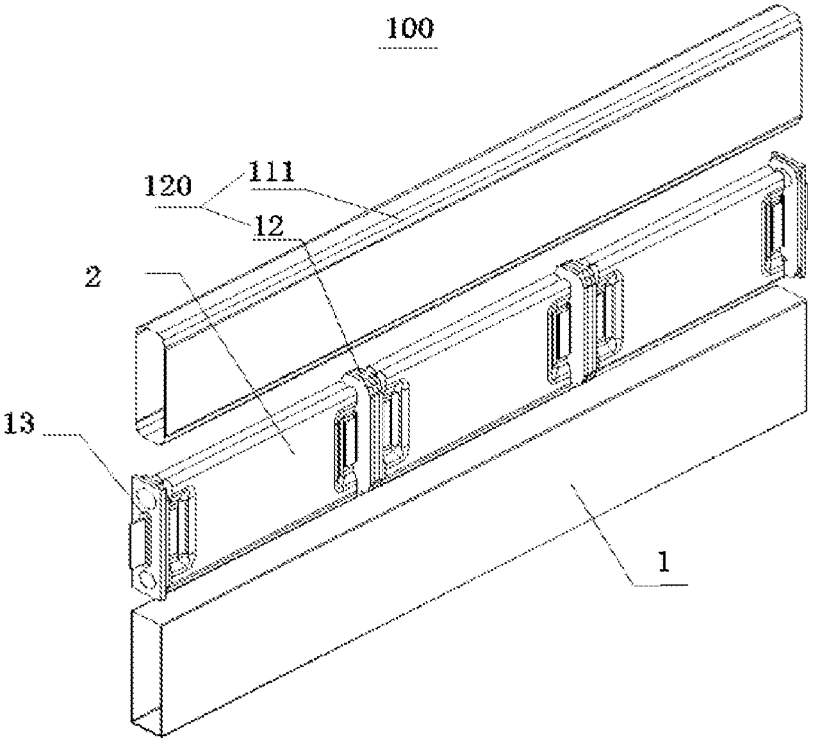
FIG. 6 is a structural exploded view of a battery according to still another embodiment of this application.

Referring to FIG. 6, which is an exploded view of yet another battery 100 according to an embodiment of this application. The housing 1 is an integrated structure extending along the first direction. A cell core assembly 120 is arranged in the housing 1. The cell core assembly 120 includes a separator film 111 and the partition plate 12. The accommodating cavity 11 is provided inside the separator film 111. The partition plates 12 are arranged in the separator film 111 at intervals. A lateral surface of each partition plate 12 fits with the separator film 111 and the internal space of the separator film 111 is divided into a plurality of accommodating cavities 11. A cavity wall of each accommodating cavity 11 includes the partition plate 12 or end cover 13 provided at the end of the accommodating cavity 11 and the separator film 111 provided between two adjacent partition plates 12 or provided between the partition plate 12 and the end cover 13.

Specifically, the cavity wall of each accommodating cavity 11 includes the partition plate 12 provided at the end of the accommodating cavity 11 and the separator film 111 provided between two adjacent partition plates 12. Alternatively, the cavity wall of the accommodating cavity 11 includes the end cover 13 provided at the end of the accommodating cavity 11 and the separator film 111 provided between the partition plate 12 and the end cover 13.

It is to be noted that, in an embodiment in which the accommodating cavity 11 is defined by the separator film 111, the plurality of accommodating cavities 11 include: an end accommodating cavity that is provided at the end of the battery 100 and defined by the end cover 13, the partition plate 12, and the separator film 111; and a middle accommodating cavity defined by the two adjacent partition plates 12 and the separator film 111. Specifically, the cavity wall of the middle accommodating cavity includes: two adjacent partition plates 12 and the separator film 111 provided between the two adjacent partition plates 12. The cavity wall of the end accommodating cavity includes: the partition plate 12 adjacent to the end of the battery 100, the end cover 13, and the separator film 111 provided between the partition plate 12 and the end cover 13.

In this application, that the lateral surface of the partition plate 12 fits in with the separator film 111 means that the lateral surface of the partition plate 12 is hermetically connected to the separator film 111, for example, is in interference fit with the separator film, so as to isolate the two adjacent accommodating cavities 11 on two sides of the partition plate 12 to form two independent cavities. In this application, that the lateral surface of the partition plate 12 fits with the housing 1 means that the lateral surface of the partition plate 12 is hermetically connected to the housing 1, for example, is in interference fit with the housing, so as to isolate the two adjacent accommodating cavities 11 on two sides of the partition plate 12 to form two independent cavities.

The separator film 111 is configured to separate lithium ions in an electrolyte solution from the housing 1. The separator film can effectively prevent the lithium ions from contacting the housing 1, reduce the possibility of lithium-aluminum reaction, and improve the safety and reliability of the battery 100 in use. In addition, the separator film 111 further serves an insulation function.

In the embodiment shown in FIG. 6, the separator film 111 is an integrated structure extending along the first direction. The separator film 111 extends to wrap around an outer peripheral wall of each partition plate 12 and at least a part of an outer peripheral wall of the end cover 13. In this way, the separator film 111 fits in with the partition plate 12 and/or end cover 13 to form a plurality of accommodating cavities 11.

Figure 7:
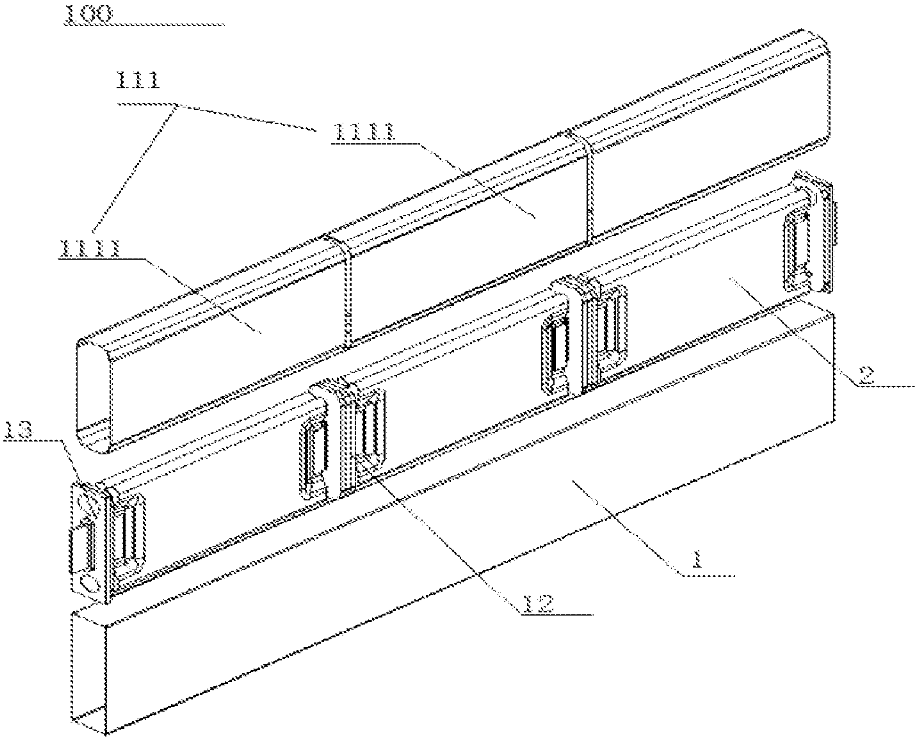
FIG. 7 is a structural exploded view of a battery according to another embodiment of this application.

As shown in FIG. 7, in other embodiments, the housing 1 is an integrated structure extending along the first direction. A cell core assembly 120 is arranged in the housing 1. The cell core assembly 120 includes the separator film 111 and the partition plate 12. The accommodating cavity 11 is provided inside the separator film 111. The separator film 111 includes a plurality of sub-separator films 1111 arranged along the first direction. Each partition plate 12 is connected to two adjacent sub-separator films 1111. A cavity wall of the accommodating cavity 11 includes the sub-separator film 1111 and the partition plate 12 and/or end cover 13 provided at the end of the sub-separator film 1111.

Apparently, the separator film 111 according to this application is not limited to the example given above. In other embodiments, the separator film 111 includes a plurality of independent sub-separator films 1111. Each sub-separator film 1111 extends along the first direction to wrap around the lateral peripheral walls of the two adjacent partition plates 12 or the lateral peripheral walls of the adjacent partition plates 12 and the end cover 13, so as to form the accommodating cavities 11.

It is to be noted that, in the embodiments in which the separator film 111 includes a plurality of sub-separator films 1111, the plurality of accommodating cavities 11 include: an end accommodating cavity that is provided at the end of the battery 100 and defined by the end cover 13, the partition plate 12, and the sub-separator film 1111; and a middle accommodating cavity defined by the partition plates 12 and the sub-separator film 1111. Specifically, the cavity wall of the middle accommodating cavity includes: the partition plates 12 and the sub-separator film 1111. The cavity wall of the end accommodating cavity includes: the partition plate 12 adjacent to the end of the battery 100, the end cover 13, and the sub-separator film 1111 provided between the partition plate 12 and the end cover 13.

However, in other embodiments of this application, the battery 100 further includes a separator film bag. The electrode core assembly 2 is provided in the separator film bag. The partition plate 12 divides an internal space of the separator film bag into a plurality of accommodating cavities 11. The separator film bag serves a function of insulation and a function of preventing contact between the lithium ions in the electrolyte solution and the housing 1, so as to increase the service life of the battery 100.

Specifically, in other embodiments, the separator film 111 may be replaced by a bag-shaped separator film bag. The partition plate 12 is provided in the separator film bag and divides the internal space of the separator film bag into a plurality of accommodating cavities 11. At least one electrode core assembly 2 is arranged in each accommodating cavity 11.

In this application, with the separator film or separator film bag arranged, a layer of hermetic wrapping structure is added in the housing 1 to improve the overall sealability of the battery 100.

In some embodiments, the housing 1 is a metal housing such as an aluminum housing. Apparently, the housing may be made of other metals instead as required. The battery 10 includes a plurality of electrode core assemblies 2 connected in series. Voltages carried by the housings 1 outside the accommodating cavities 11 that accommodate different electrode core assemblies 2 vary between each other. In some circumstances, the potential of the aluminum housing at some positions is too low. Consequently, the lithium ions are intercalated into the aluminum housing to form a lithium-aluminum alloy, the service life of the battery 10 is impaired. The separator film or separator film bag can effectively prevent the lithium ions from contacting the housing 1, reduce the possibility of lithium-aluminum reaction, and improve the safety and reliability of the battery 10 in use. In addition, the separator film 111 further serves an insulation function.

In this application, a wall of the separator film 111 or separator film bag may be a double-layered film.

Both the separator film 111 and the separator film bag are insulative and resistant to electrolyte solution corrosion to some extent, and may be specifically an ion separator film. The material of the ion separator film is not particularly limited, as long as the material can provide insulation and avoid reacting with the electrolyte solution. In some embodiments, the material of the ion separator film may include polypropylene (PP), polyethylene (PE), or a multi-layered composite film. For example, the separator film includes an inner layer, an outer layer, and a middle layer between the inner layer and the outer layer. The inner layer includes a plastic material. For example, the inner layer may be made of an insulative material that is little reactive with the electrolyte solution. The middle layer includes a metal material, and can prevent penetration of moisture outside the battery and prevent leakage of the internal electrolyte solution. In a case that the middle layer is a metal layer, the metal layer is preferably an aluminum foil, a stainless steel foil, a copper foil, or the like. Considering formability, lightweight, and cost-effectiveness, the metal layer is preferably an aluminum foil. The material of the aluminum foil is preferably a pure aluminum-based or aluminum-iron-based alloy material. The outer layer is a protection layer, and is mostly made of a polyester or nylon material with a high melting point and achieves relatively high mechanical performance, thereby preventing damage to the battery caused by an external force and protecting the battery. For example, the outer layer is an aluminum-plastic composite film.

As shown in FIG. 1 and FIG. 2, one side of the spacer Q1 abuts against an end of the electrode core assembly 2 that faces the spacer Q1 along the first direction. The other side of the spacer Q1 abuts against or is fixed to the partition plate 12; or the other side of the spacer Q1 abuts against or is fixed to the end cover 13. In this way, the spacer Q1 abuts tightly between the end of the electrode core assembly 2 and the corresponding partition plate 12 or end cover 13. The spacers Q1 at two ends of the electrode core assembly 2 tightly clamp the electrode core assembly 2.

Specifically, the other side of the spacer Q1 arranged between the end cover 13 and the electrode core assembly 2 abuts against or is fixed to the end cover 13, and the other side of the spacer Q1 arranged between the partition plate 12 and the electrode core assembly 2 abuts against or is fixed to the partition plate 12.

Figure 8:
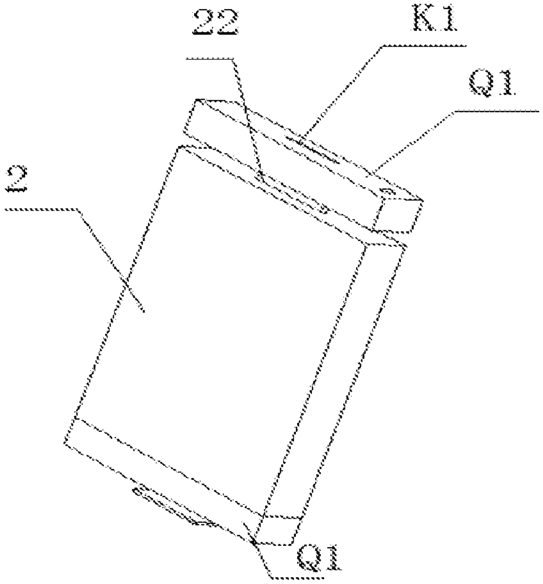
FIG. 8 is a schematic exploded view of an electrode core assembly fixed by a spacer according to an embodiment of this application.
Figure 9:
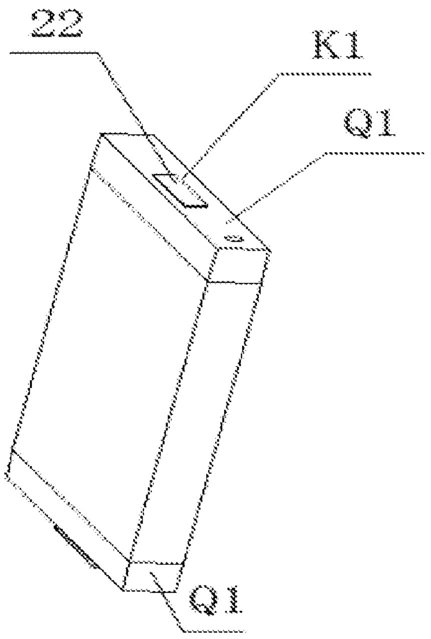
FIG. 9 is a schematic overall view of an electrode core assembly fixed by a spacer according to an embodiment of this application.

Referring to FIG. 8 and FIG. 9, which are a schematic exploded view and a schematic overall view, respectively, of an electrode core assembly 2 fixed by the spacer Q1. A through-hole K1 is formed in the spacer Q1. An electrode lead-out member 22 protrudes from each of two ends of the electrode core assembly 2 along the first direction. At least a part of the electrode lead-out member 22 is provided in the through-hole K1.

As shown in FIG. 8 and FIG. 9, the spacer Q1 is an integrated structure. The through-hole K1 is a through-hole that runs through a middle portion of the spacer Q1.

Figure 10:
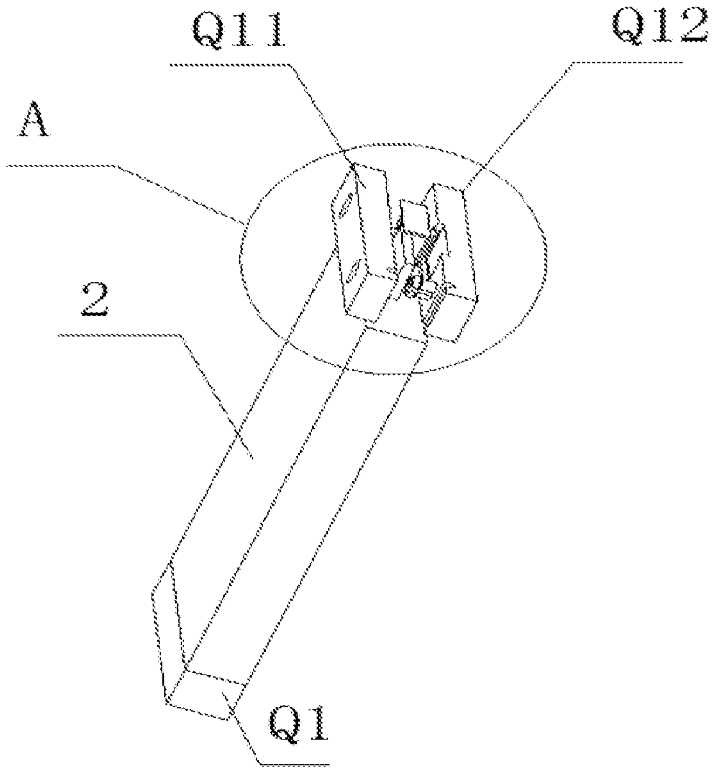
FIG. 10 is a schematic exploded view of an electrode core assembly fixed by a spacer according to another embodiment of this application.
Figure 11:
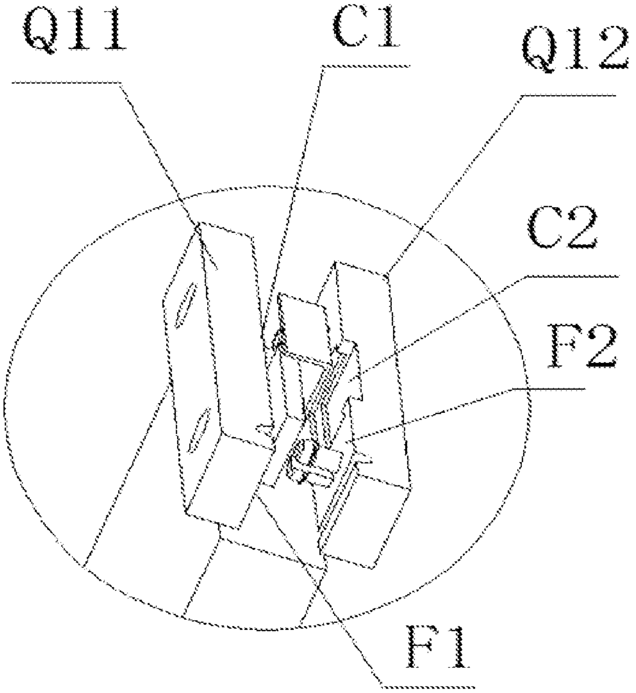
FIG. 11 is a partially enlarged view of part A of FIG. 10.
Figure 12:
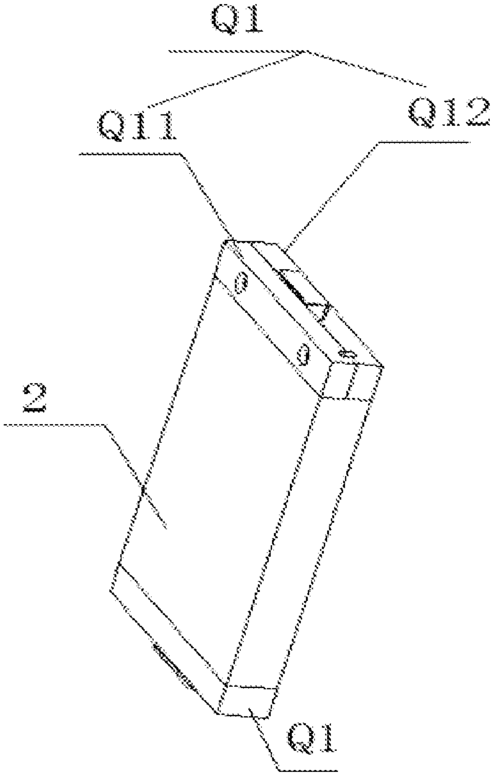
FIG. 12 is a schematic overall view of an electrode core assembly fixed by a spacer according to another embodiment of this application.

Referring to FIG. 10 to FIG. 12 together, FIG. 10 is a schematic exploded view of an electrode core assembly 2 fixed by a spacer Q1; FIG. 11 is a partially enlarged view of part A of FIG. 10; and FIG. 12 is a schematic overall view of another electrode core assembly 2 fixed by a spacer Q1. The spacer Q1 includes the first spacer portion Q11 that includes the first groove C1, and the second spacer portion Q12 that includes the second groove C2. The first spacer portion Q11 fits in with and is fixed to the second spacer portion Q12. The first groove C1 and the second groove C2 are directly opposite to each other to form the through-hole K1.

Specifically, in another embodiment, the spacer Q1 is compounded of two spacer portions. The two spacer portions fit in with each other to form the through-hole K1 to surround the electrode lead-out member 22. One side of both spacer portions abuts against the end that is of the electrode core assembly 2 and that faces the spacer Q1 along the first direction. The other side of both spacer portions abuts against or is fixed to the partition plate 12; or the other side of both spacer portions abuts against or is fixed to the end cover 13.

As shown in FIG. 11, the first spacer portion Q11 includes the first fitting surface F1. The second spacer portion Q12 includes the second fitting surface F2. That is, each of the first spacer portion Q11 and the second spacer portion Q12 includes a fitting surface. An opening of the first groove C1 is made on the first fitting surface F1 of the first spacer portion Q11. An opening of the second groove C2 is made on the second fitting surface F2 of the second spacer portion Q12. The first fitting surface F1 of the first spacer portion Q11 and the second fitting surface F2 of the second spacer portion Q12 are opposite to each other. The first spacer portion Q11 and the second spacer portion Q12 fit in with and are fixed to each other to form the spacer Q1. The first fitting surface F1 fits, or is spaced to some extent apart from, the second fitting surface, so that the first groove C1 and the second groove C2 form the through-hole K1.

The first spacer portion Q11 and the second spacer portion Q12 fit in with and are fixed to each other by at least one of screw locking, bonding, or clasping, to form the spacer Q1.

Figure 13:
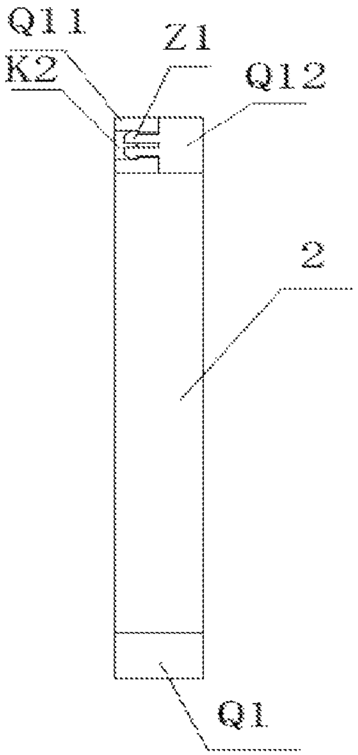
FIG. 13 is a schematic diagram of fitting and fixing a spacer by clasping according to this application.

Referring to FIG. 13, which is a schematic diagram of fitting and fixing a spacer Q1 by clasping. As shown in FIG. 13, the first spacer portion Q11 and the second spacer portion Q12 fit in with and are fixed to each other by clasping. A clasping hole K2 is made in a non-grooved region on the fitting surface F1 of the first spacer portion Q11. A clasping stud Z1 is formed in a non-grooved corresponding region on the fitting surface F2 of the second spacer portion Q12 by extending in a direction away from the fitting surface F2. The clasping stud Z1 is clasped and accommodated in the clasping hole K2 of the first spacer portion Q11, thus the second spacer portion Q12 fits in with and is fixed to the first spacer portion Q11.

Specifically, the first spacer portion Q11 is snap-fitted to the second spacer portion Q12. The clasping hole K2 is made in the non-grooved region of the fitting surface of the first spacer portion Q11. The clasping stud Z1 is arranged in the non-grooved region of the fitting surface of the second spacer portion Q12. The clasping stud Z1 extends in a direction away from the fitting surface of the second spacer portion Q12. The clasping stud Z1 is configured to clasp and be fixed into the clasping hole K2.

The number of clasping holes K2 is equal to the number of clasping studs Z1, and may be at least two. For example, the clasping holes K2 are made at positions on two opposite sides of the groove on the fitting surface F1 of the first spacer portion Q11. The clasping stud Z1 is formed at the positions on the two opposite sides of the groove of the fitting surface F2 of the second spacer portion Q12 by extending in a direction away from the fitting surface F2.

In other embodiments, the clasping hole K2 is made, and the clasping stud Z1 is formed by extending, at the positions on the two opposite sides of the groove on the fitting surface F1 of the first spacer portion Q11, respectively; and, the clasping stud Z1 is formed by extending, and the clasping hole K2 is made, at the positions on the two opposite sides of the groove on the fitting surface F2 of the second spacer portion Q12, respectively. In other words, the clasping stud Z1 and the clasping hole K2 may be arranged at the first spacer portion Q11 concurrently. The clasping hole K2 and the clasping stud Z1, which snap-fit the clasping stud Z1 and the clasping hole K2 respectively, may be arranged at the corresponding positions of the second spacer portion Q12.

Referring back to FIG. 1 and FIG. 14, an electrolyte solution guiding hole 121 is arranged on the partition plate 12. The electrolyte solution guiding hole 121 is configured to link two adjacent accommodating cavities 11. In an embodiment of this application, as shown in FIG. 2, 2 partition plates 12 are arranged in the housing 1. The 2 partition plates 12 divide the internal space of the housing 1 into 3 accommodating cavities 11. In addition, an electrode core assembly 2 is arranged in each accommodating cavity 11. A plurality of electrode core assemblies 2 are sequentially connected in series. In other embodiments of this application, the number of partition plates 12 may be 1 or more than 2. In addition, each accommodating cavity 11 may accommodate just one electrode core assembly 2 as shown in FIG. 2, or each accommodating cavity 11 may accommodate a plurality of electrode core assemblies 2, for example, two or three electrode core assemblies, side by side.

Figure 14:
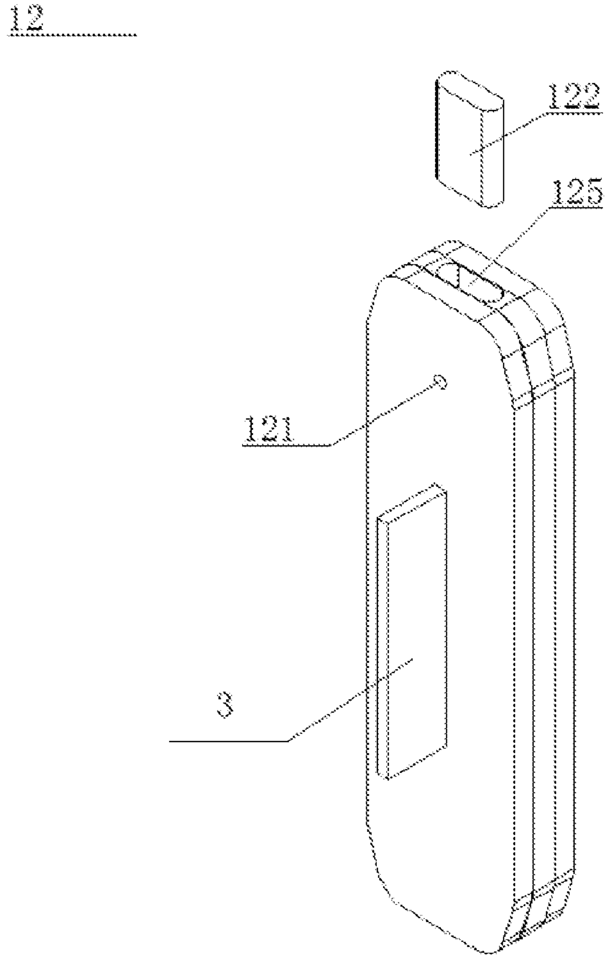
FIG. 14 is a structural exploded view of a partition plate according to an embodiment of this application.
Figure 15:
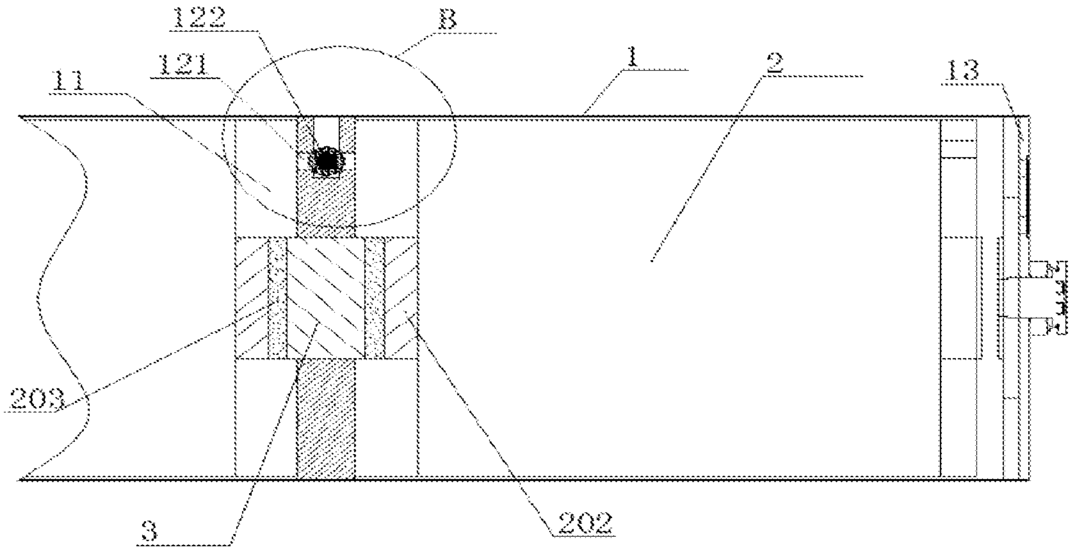
FIG. 15 is a partial cross-sectional schematic view of a battery structure according to another embodiment of this application.
Figure 16:
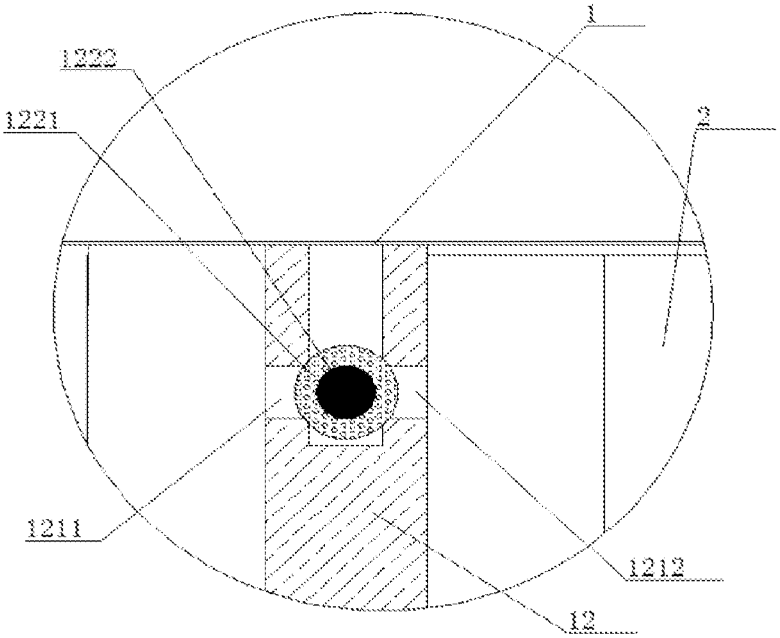
FIG. 16 is a partially enlarged view of part B of FIG. 15.

Referring to FIG. 14 to FIG. 16 together, the battery 100 according to this application further includes a blocking mechanism 122. The blocking mechanism 122 is provided in the housing 11. The blocking mechanism 122 can make the electrolyte solution guiding hole 121 be in a preset state. The preset state includes an opening state and a closed state.

When the blocking mechanism 122 is in the second circumstance, the electrolyte solution guiding hole 121 is closed. FIG. 16 shows a state of the battery 100 after electrolyte solution filling. In this case, the blocking mechanism 122 is in the second circumstance, which is the same as a normal use state of the battery 100. In this state, the blocking mechanism 122 closes the electrolyte solution guiding hole 121.

In some embodiments of this application, the blocking mechanism 122 can fully close the electrolyte solution guiding hole 121, or partly close the electrolyte solution guiding hole 121, as long as the electrolyte solution is isolated between adjacent accommodating cavities 11. Under general operating conditions of the battery 100, although complete seal-off and isolation are not implemented between the accommodating cavities 11, the electrolyte solution guiding hole 121 is arranged at a specific height, thereby making it unlikely to transfer the electrolyte solution between the accommodating cavities during use.

In an embodiment of this application, before the electrolyte solution filling in the battery, the electrolyte solution guiding hole links two adjacent accommodating cavities on both sides of the partition plate. In this way, during vacuuming of one of the accommodating cavities, the air in the other accommodating cavity that is adjacent can flow to the vacuumed accommodating cavity through the electrolyte solution guiding hole. In this way, it is not necessary to perform the vacuuming operation for each accommodating cavity separately, thereby improving work efficiency and saving the cost.

Figure 17:
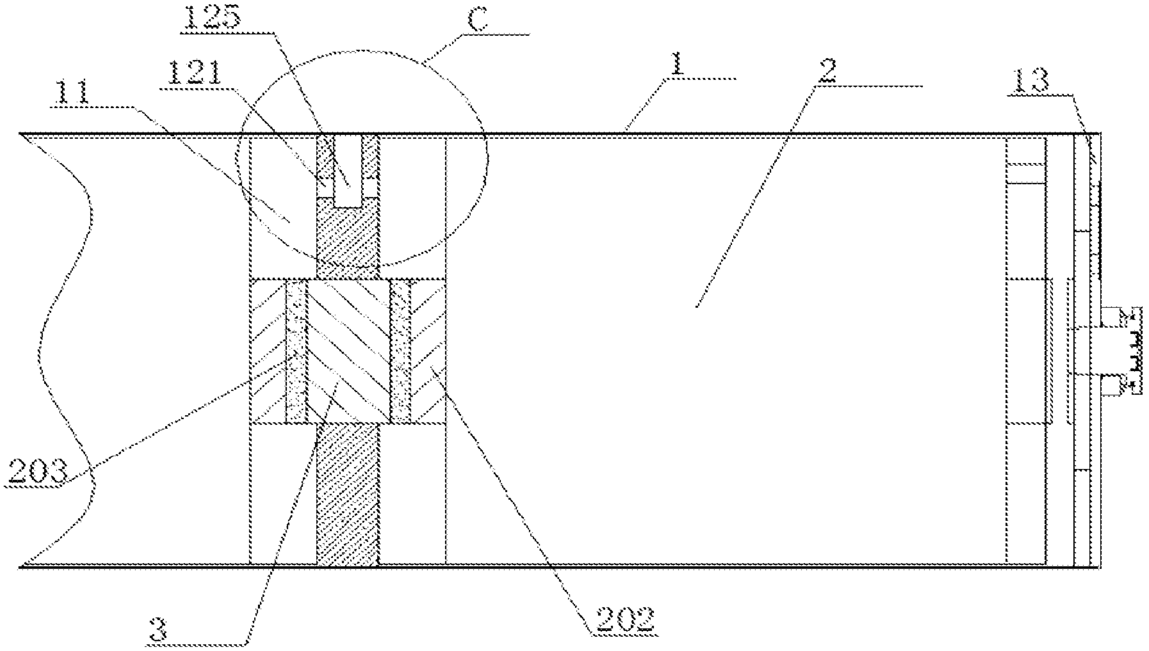
FIG. 17 is a partial cross-sectional schematic view of a structure of a lithium-ion battery with a blocking mechanism being removed in FIG. 15.
Figure 18:
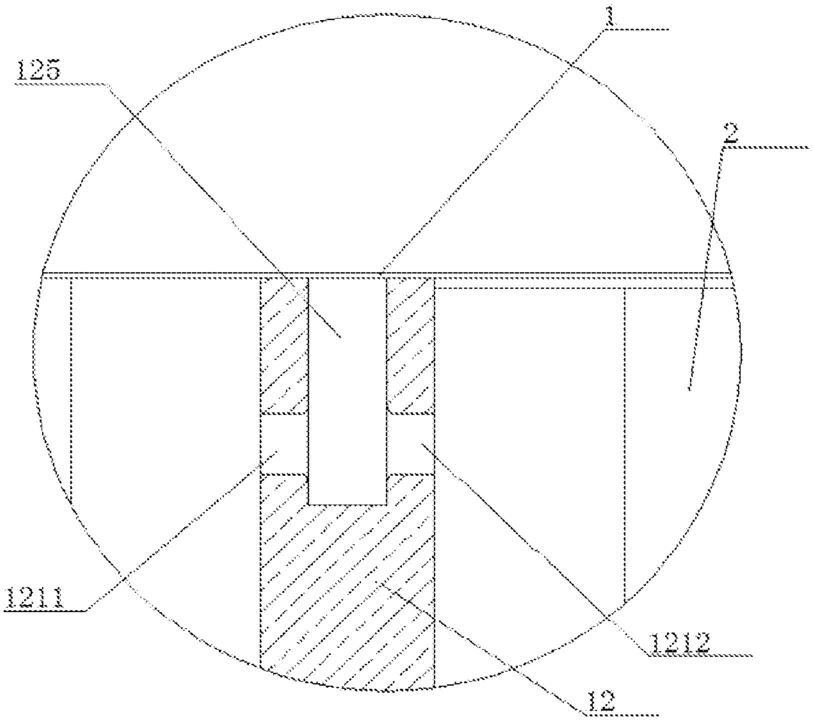
FIG. 18 is a partially enlarged view of part C of FIG. 17.

In an embodiment of this application, during electrolyte solution filling in the battery 100, as shown in FIG. 17 and FIG. 18, the electrolyte solution guiding hole 121 links the two adjacent accommodating cavities 11. After electrolyte solution filling or during normal use of the battery 100, as shown in FIG. 15 and FIG. 16, the blocking mechanism 122 closes the electrolyte solution guiding hole 121.

In other embodiments, the battery 100 may be in an overcharged state or a short-circuited state. In such states, gases inside the battery 100 need to be exhausted as soon as practicable. A method of exhausting the gases is to link the accommodating cavities 11 to exhaust the internal gases out of the housing 11 as soon as practicable. Alternatively, when the electrode core assembly 2 in an accommodating cavity 11 is in an overcharged state or a short-circuited state, an accommodating cavity 11 is linked to an adjacent accommodating cavity 11. Therefore, when the gases in an accommodating cavity expand due to heat-up caused by the overcharging or short-circuiting, the gases in the accommodating cavity can be exhausted into other accommodating cavities 11 to reduce air pressure in the accommodating cavity 11. Therefore, when the battery 100 is in an overcharged state or short-circuited state, the blocking mechanism 122 is in the first circumstance, and the blocking mechanism 122 opens the electrolyte solution guiding hole 121. The electrolyte solution guiding hole 121 links the two adjacent accommodating cavities 11.

In an embodiment, as shown in FIG. 15 and FIG. 16, the battery 10 is in a state of after electrolyte solution filling or normal use, and the blocking mechanism 122 is in the second circumstance. The blocking mechanism 122 closes the electrolyte solution guiding hole 121 to prevent the electrolyte solution guiding hole 121 from linking the two adjacent accommodating cavities 11. In this way, the two adjacent accommodating cavities 11 are fully isolated from each other.

In this application, the electrode core assembly 2 may include a single electrode core 201, or may include at least two electrode cores 201. The at least two electrode cores 201 are connected in parallel to form the electrode core assembly 2. As shown in FIG. 3, two electrode cores 201 are connected in parallel to form the electrode core assembly 2, or four electrode cores 201 are connected in parallel to form the electrode core assembly 2.

At least one partition plate 12 is arranged, that is, one, two, three, or more, and mostly, preferably 2 or more partition plates, are arranged, inside the housing 1.

In this application, the partition plate 12 is arranged between adjacent accommodating cavities 11 to prevent the electrolyte solution in an excessively long battery 10 from decomposing due to a relatively large pressure difference, where decomposition impairs the performance of the battery 100. Preferably, in order to better serve the functions of insulation and isolation, the partition plate 12 may be made of an insulation material. That is, the partition plate 12 is an insulation partition plate 12. In this way, without a need to perform other operations, the two accommodating cavities 11 can be directly isolated from each other and insulated from each other by the partition plate 12.

The partition plate 12 is configured to divide the internal space of the housing 1 into at least two accommodating cavities 11. The electrode core assemblies 2 are accommodated in the accommodating cavities 11. Generally, as shown in FIG. 2, each accommodating cavity 11 accommodates one electrode core assembly 2. At least two electrode core assemblies 2 are connected in series. Generally, the number of electrode core assemblies 2 connected in series depends on the output voltage of each electrode core assembly 2, a width of a battery pack 200, and a required overall voltage of the battery pack 200. For example, for a vehicle model, the voltage that required to be output by a battery 100 system is 300 V, the voltage of a conventional iron-lithium battery 10 is 3.2 V. In the related art, 100 batteries 100 need to be connected in series in a pack to meet requirements. However, in the battery pack 200 according to this application, assuming that 2 electrode core assemblies 2 are connected in series in a battery 100, just 50 batteries 100 need to be arranged. The design of the whole pack and the arrangement of the batteries 100 are greatly simplified, and the space can be effectively utilized to improve space efficiency.

Apparently, an accommodating cavity 11 may accommodate multiple electrode core assemblies 2 instead. The electrode core assemblies 2 in each accommodating cavity 11 are connected in parallel. For example, the number of electrode core assemblies 2 in an accommodating cavity 11 is two or three. Two electrode core assemblies 2 are connected in parallel or three electrode core assemblies 2 are connected in parallel. It is to be understood that, according to actual needs, the number of electrode core assemblies accommodated in an accommodating cavity may be the same or different between the accommodating cavities.

In this application, the electrode core assemblies 2 provided in different accommodating cavities 11 are connected in series.

It is to be noted that, a series connection between the electrode core assemblies in the two adjacent accommodating cavities may be a direct series connection or an indirect series connection, such as a series connection performed through an intermediate piece.

Figure 19:
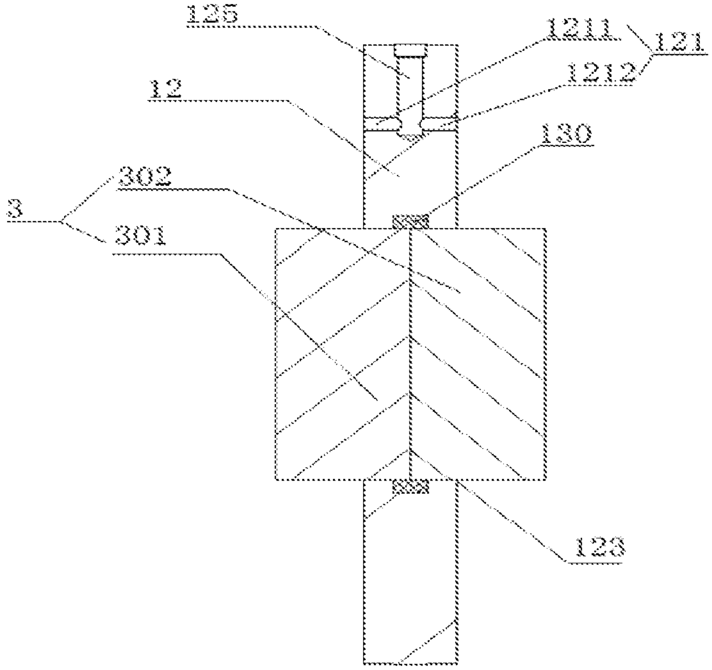
FIG. 19 is a schematic structural diagram of a partition plate with a sealing ring according to an embodiment of this application.
Figure 20:
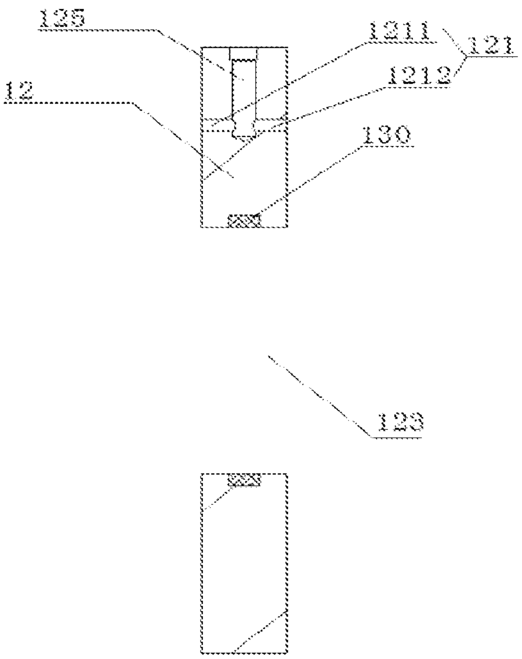
FIG. 20 is a schematic structural diagram of a partition plate and an electrode core connector that are integrally injection-molded according to an embodiment of this application.
Figure 21:
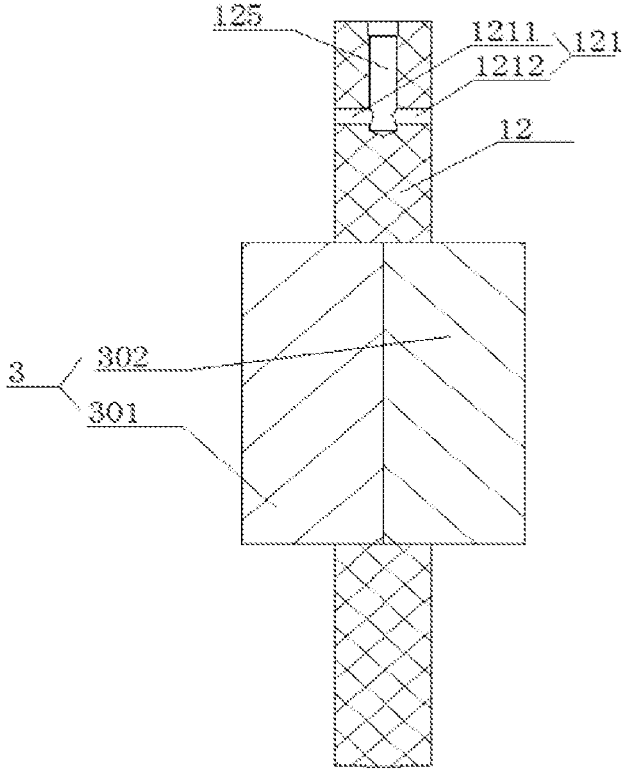
FIG. 21 is a schematic diagram of a communication hole in a partition plate according to an embodiment of this application.

Referring to FIG. 19 to FIG. 21 together, in an embodiment of this application, the battery 100 further includes an electrode core connector 3. Two adjacent electrode core assemblies 2 are connected in series by the electrode core connector 3. In this application, two adjacent electrode core assemblies 2 are provided inside the same housing 11, thereby greatly reducing the spacing between the two electrode core assemblies 2. Compared to the practice in which the two batteries 100 are connected by a power connector, this application simplifies a subsequent assembly process of the battery pack 200, and reduces material consumption and weight. In addition, the two electrode core assemblies 2 are mounted in the same housing 11, thereby greatly reducing the requirements on stability and firmness of the electrode core connector 3. Without a need to consider connection reliability, this application allows more space for designing the electrode core connector 3, increases the passage area of the electrode core connector, and reduces internal resistance of the battery 100.

For the electrode core connector 3, in an embodiment of this application, a connection and positional relationship between the electrode core connector 3 and the partition plate 12 is disclosed. As shown in FIGS. 19 to 21, a communication hole 123 is further made on the partition plate 12. The electrode core connector 3 is threaded through the communication hole 123 from one side to the other side of the communication hole 123. In other words, the electrode core connector 3 is threaded through the communication hole 123, one end of the electrode core connector 3 is connected to the electrode core assembly 2 on one side of the partition plate 12, and the other end of the electrode core connector 3 is connected to the electrode core assembly 2 on the other side of the partition plate 12. In order to implement isolation between the accommodating cavities 11 on both sides of the partition plate 12, a sealing structure 130 is arranged in the communication hole 123. The sealing structure 130 seals the electrode core connector 3 in the communication hole 123. In addition, the sealing structure 130 can close the communication hole 123 to implement isolation between adjacent accommodating cavities 11 on two sides of the partition plate 12.

Described above is a specific solution to mounting the electrode core connector 3 according to an embodiment of this application. However, in this solution, the communication hole 123 needs to be sealed for the second time, thereby leading to inconvenience of operation. In addition, during the second operation of sealing, the selection of the material for making up the sealing structure 130 is complicated, and may affect the electrolyte solution inside the battery 100. In view of the problem above, as shown in FIG. 21, a solution to integrally forming the electrode core connector 3 and the partition plate 12 is provided in another embodiment of this application. In this solution, the electrode core connector 3 and the partition plate 12 are integrally formed. Specifically, the electrode core connector 3 is made first, and then the partition plate 12 is injection-molded outside the electrode core connector 3. During the assembling, an electrode core assembly 2 is directly connected to the electrode core connector 3, without a communication hole left to be sealed, thereby simplifying processes and reducing risks.

The electrode lead-out member 22 of the electrode core assembly 2 is threaded through the through-hole K1 of a spacer Q1 and electrically connected to the electrode core connector 3. The electrode core assemblies 2 in adjacent accommodating cavities 11 are connected in series by the electrode core connector 3.

In some embodiments, the electrode core connector 3 includes two connecting portions made of different materials.

As shown in FIG. 19 and FIG. 21, the electrode core connector 3 includes a copper connection piece 301 and an aluminum connection piece 302. The copper connection piece 301 is electrically connected to the aluminum connection piece 302, and a position of an electrical connection is inside the partition plate 12. In this embodiment, the copper connection piece 301 is connected to the electrode lead-out member 22 of the electrode core assembly 2 on one side of the partition plate 12. The aluminum connection piece 302 is connected to a lead-out end of the electrode lead-out member 22 of the electrode core assembly 2 on the other side of the partition plate 12.

More specifically, the copper connection piece 301 is compositely connected to the aluminum connection piece 302 first to form a composite connecting portion. Subsequently, the partition plate 12 is formed by injection molding outside the composite connecting portion. In this way, a position of contact (composite connecting portion) between the copper connection piece 301 and the aluminum connection piece 302 is sealed inside the partition plate 12 to prevent exposing the composite connecting portion in an internal space of a battery 100, especially to prevent contact between the composite connecting portion and an electrolyte solution and avoid corrosion at the position of copper-aluminum connection.

In some embodiments, the electrode lead-out members 22 at two ends of the electrode core assembly 2 may be made of different materials, and the material of the electrode lead-out member at each end of the electrode core assembly may be identical to the material of a directly facing connecting portion of the electrode core connector 3 in the partition plate 12. For example, the electrode lead-out member 22 that is provided at one end of the electrode core assembly 2 and connected to the copper connection piece 301 of the electrode core connector 3 is also made of copper. The electrode lead-out member 22 that is provided at the other end of the electrode core assembly 2 and connected to the aluminum connection piece 302 of the electrode core connector 3 is also made of aluminum.

In an embodiment of this application, the electrode lead-out members 22 at the two ends of the electrode core assembly 2 are arranged on two opposite sides of the electrode core assembly 2 along the first direction. All the electrode core assemblies 2 in the housing are arranged along the first direction. The first direction is the length direction of the battery 100. In other words, the electrode core assemblies 2 are arranged in a head-to-head manner. This arrangement manner enables convenient implementation of the series connection between the electrode core assemblies 2 and simplifies a connection manner and processing and assembling processes.

In an embodiment of this application, as shown in FIG. 1, an opening of the housing 1 is provided at the end of the housing 1 along the first direction (the X direction in FIG. 1). The end cover 13 is configured to seal off the opening of the housing 1, and an upper side and a lower side of the housing 1 are sidewalls of the housing 1. In a general design, an electrolyte solution filling port is made on the end cover 13. In this application, an electrolyte solution guiding hole 121 is arranged on the partition plate 12. In this way, an electrolyte solution can be guided into each accommodating cavity 11 just by being filled from the end cover 13 at the end of the battery 100. In this solution, the electrolyte solution can be filled into all accommodating cavities 11 at a time, without a need to open the opening and fill the electrolyte solution for several times. As shown in FIG. 1, in an embodiment of this application, the first direction (the X direction shown in the drawing, that is, a left-right direction) is the length direction of the battery 100, and is also an arrangement direction (series connection direction) of the electrode core assemblies 2 inside the battery 100.

However, when the number of the electrolyte solution filling ports is 2, the electrolyte solution guiding hole 121 may be omitted on one partition plate 12 among the plurality of partition plates 12. For example, end covers 13 are arranged at both ends of the housing 1 along the first direction. An electrolyte solution filling channel, that is, the electrolyte solution filling port, is arranged on each end cover 13. No electrolyte solution guiding hole 121 is made on one partition plate 12 among the plurality of partition plates 12, and this one partition plate 12 is denoted as the first partition plate. The electrolyte solution guiding hole is made on all remaining partition plates, and the remaining partition plates are denoted as second partition plates. The electrolyte solution filling channel provided on the end cover 13 on the first side of the first partition plate is configured to fill the electrolyte solution into the accommodating cavity 11 provided on the first side. The electrolyte solution filling channel provided on the end cover 13 on the second side of the first partition plate is configured to fill the electrolyte solution into the accommodating cavity 11 provided on the second side. The electrolyte solution guiding hole 121 of each of the second partition plates is configured to link the accommodating cavities 11 provided on both sides of each of the second partition plates. Therefore, the electrolyte solution filled from the electrolyte solution filling channel on the end cover 13 on the first side of the first partition plate flows into all accommodating cavities 11 on the first side of the first partition plate through the electrolyte solution guiding hole 121 arranged on each of the second partition plates on the first side. The electrolyte solution filled from the electrolyte solution filling channel on the end cover 13 on the second side of the first partition plate flows into all accommodating cavities 11 on the second side of the first partition plate through the electrolyte solution guiding hole 121 arranged on each of the second partition plates on the second side. Apparently, the position of the electrolyte solution filling channel may be on the housing 1 according to actually needs. For example, the electrolyte solution filling channel may be arranged on a housing wall that is of the housing 1 and that corresponds to an accommodating cavity 11.

In the field of power batteries, the consistency of working conditions between the batteries 100 is of vital importance, and directly affects the performance of the overall battery pack 200. Similarly, in this application, the consistency of working conditions between electrode core assemblies 2 inside the battery 100 also affects the overall performance of each battery 100, and in turn, affects the performance of the entire battery pack 200. The amount of the electrolyte solution inside the battery 100 affects the performances, such as a capacity, an activity, and the like, of the battery 100. Therefore, in this application, at least two partition plates 12 divide the internal space of the housing 1 into at least three accommodating cavities 11. The electrolyte solution guiding hole 121 on each partition plate 11 is a cylindrical hole that runs through the partition plate 12 in the first direction. The electrolyte solution guiding hole 121 of each of the partition plates 12 are coaxially arranged. In this way, using a central axis of the electrolyte solution guiding hole 121 as a reference line, a liquid level of the electrolyte solution in each of the accommodating cavities 11 can be well controlled. Therefore, a consistency of an amount of the electrolyte solution between all the accommodating cavities 11 can be well controlled, thereby ensuring consistency between the electrode core assemblies 2.

In addition, more preferably, all electrolyte solution guiding holes 121 may be identical in inner diameter and arranged coaxially. In this way, it is easier to control the consistency of the amount of the electrolyte solution more precisely. In addition, from under the central axis, it can be determined whether the liquid level of the electrolyte solution is consistent. The overall consistency is improved, the difficulty of determining consistency is reduced, an operability is improved, and high performances of the battery 100 is ensured.

As shown in FIG. 19 and FIG. 21, in an embodiment of this application, a blocking mechanism space 125 is provided on the partition plate 12. The first position and the second position used to accommodate the blocking mechanism 122 are formed in the blocking mechanism space 125. The blocking mechanism 122 can move from the first position to the second position under a force. Before or during electrolyte solution filling, or before the electrolyte solution filling and formation, or during overcharge or short-circuit of the battery 100, the blocking mechanism 122 is provided at the first position, that is, the blocking mechanism 125 is in the first circumstance, and therefore, the electrolyte solution guiding hole 121 links two adjacent accommodating cavities 11. When the battery 100 is in a state of after electrolyte solution filling or normal use or in a state of after electrolyte solution filling and formation, the blocking mechanism 122 is provided at the second position, that is, the blocking mechanism 122 is in the second circumstance, and therefore, the blocking mechanism 122 closes the electrolyte solution guiding hole 121 to prevent the electrolyte solution guiding hole 121 from linking the two adjacent accommodating cavities 11.

Specifically, when the blocking mechanism 122 is provided at the first position, the electrolyte solution guiding hole 121 is in an open state. When the blocking mechanism 122 is provided at the second position, the electrolyte solution guiding hole 121 is in a closed state.

As shown in FIG. 16 and FIG. 17, the blocking mechanism space 125 is in communication with the electrolyte solution guiding hole 121.

In the embodiment described above, the blocking mechanism space 125 is a space inside the partition plate 12. That is, no opening of the blocking mechanism space 125 is made in a circumferential direction of the partition plate 12. The blocking mechanism 122 is placed in the blocking mechanism space 125. Before the electrolyte solution is filled, the blocking mechanism 122 is provided at the first position in the blocking mechanism space 125. In this case, the blocking mechanism 122 does not close the electrolyte solution guiding hole 121. After the electrolyte solution is filled, an external force is exerted on the blocking mechanism 122. In this way, the blocking mechanism moves from the first position to the second position in the blocking mechanism space 125, and closes the electrolyte solution guiding hole 121 to prevent the electrolyte solution guiding hole 121 from linking the two adjacent accommodating cavities 11.

In an embodiment of this application, as shown in FIG. 19 and FIG. 21, the blocking mechanism space 125 intersects the electrolyte solution guiding hole 121. The electrolyte solution guiding hole 121 is divided by the blocking mechanism space 125 into the first electrolyte solution guiding hole 1211 and the second electrolyte solution guiding hole 1212. Both the first electrolyte solution guiding hole 1211 and the second electrolyte solution guiding hole 1212 are in communication with a closed space of the blocking mechanism space 125 to link two adjacent accommodating cavities 11.

In another embodiment, the first electrolyte solution guiding hole 1211 and the second electrolyte solution guiding hole 1212 are cylindrical holes, and the first electrolyte solution guiding hole 1211 and the second electrolyte solution guiding hole 1212 are coaxially arranged. During assembling, especially during the electrolyte solution filling, the consistency of the liquid level of the electrolyte solution can be well determined. To say the least, when the liquid level of the electrolyte solution rises to a central axis of the first electrolyte solution guiding hole 1211 and the second electrolyte solution guiding hole 1212, it can be determined that the liquid level of the electrolyte solution is consistent between all accommodating cavities 11.

The inner diameter is identical between the first electrolyte solution guiding hole 1211 and the second electrolyte solution guiding hole 1212, and further, the first electrolyte solution guiding hole 1211 and the second electrolyte solution guiding hole 1212 can be kept arranged coaxially to more effectively control the amount of the electrolyte solution to be filled and the level of the electrolyte solution.

In the foregoing embodiment of this application, the blocking mechanism 122 is a sphere. An outer diameter of the blocking mechanism 122 is larger than an outer diameter of the first electrolyte solution guiding hole 1211 and/or the second electrolyte solution guiding hole 1212. In this way, the spherical blocking mechanism 122 can close the first electrolyte solution guiding hole 1211 and/or the second electrolyte solution guiding hole 1212 more efficiently to prevent linkage between the two adjacent accommodating cavities 11.

In this embodiment, as shown in FIG. 17, when the spherical blocking mechanism 122 closes the first electrolyte solution guiding hole 1211 and/or the second electrolyte solution guiding hole 1212, an upper part of the spherical blocking mechanism 122 is at least partly provided in the first space. A lower part of the blocking mechanism 122 is at least partly provided in the second space. A part that is of the spherical blocking mechanism 122 and that is provided in a closed space is configured to close the first electrolyte solution guiding hole 1211 and/or the second electrolyte solution guiding hole 1212, and both the upper part and the lower part are provided outside the closed space. The blocking mechanism 122 can be in better interference fit in the closed space, and can fully close the first electrolyte solution guiding hole 1211 and/or the second electrolyte solution guiding hole 1212.

In this application, to enable the blocking mechanism 122 to implement isolation of the first electrolyte solution guiding hole 1211 and/or the second electrolyte solution guiding hole 1212, the blocking mechanism 122 is connected to an inner wall of the blocking mechanism space 125 by means of interference fit. In this way, the blocking mechanism 122 can seal at least one opening of the first electrolyte solution guiding hole 1211 and/or the second electrolyte solution guiding hole 1212, where the interior of the opening corresponds to the closed space.

In this embodiment, the blocking mechanism 122 is built in the partition plate 12 and provided in the housing 1. During assembling of the battery 100, the partition plate 12 with the blocking mechanism 122 is generally combined with the electrode core assembly 2 first to get a combination, and then the combination is put into the housing 1. After assembling, the electrolyte solution is filled into the housing 1, and then the housing is sealed. Therefore, a linchpin of the built-in blocking mechanism 122 solution is how to adjust the position of the blocking mechanism 122 from a non-sealed position to a sealed position without impairing the sealing reliability after the blocking mechanism is built in the partition plate 12.

In an embodiment of this application, a magnetic sealing element with magnetic properties is used as the blocking mechanism 122 according to this application. During the preparation of the battery 100, the blocking mechanism 122 is placed in the partition plate 12, and a blocking mechanism space 125 is arranged in the partition plate 12. Due to the magnetism of the blocking mechanism 122, after the electrolyte solution is filled, a magnetic field is applied to the blocking mechanism 122 to attract the blocking mechanism, so that the blocking mechanism moves from the first position to the second position. In this solution, under the effect of the magnetic field applied externally, a magnetic force is used as an external force exerted on the blocking mechanism 122, so that the blocking mechanism 122 can be appropriately moved without a need to making an additional design on the partition plate 12. Meanwhile, the strength of the external force on the blocking mechanism 122 can be adjusted by controlling the size of the magnetic field.

Therefore, the force received can be adjusted depending on the application scenario, thereby ensuring the sealing effect of the blocking mechanism 122.

Generally, a magnetic body with magnetic properties is rigid and tough. As connected to and supported by the magnetic blocking mechanism, the partition plate 12 is also tough and rigid. In this application, however, the blocking mechanism 122 needs to be sealed inside the partition plate 12 by means of an interference fit. Under the condition that both the blocking mechanism 122 and the partition plate 12 are rigid, the interference fit between them is not effective, and the sealing effect is poor. Therefore, in an embodiment of this application, the magnetic sealing element is coated with an insulation layer, such as a rubber layer. The insulation layer is highly effective in deforming, and can effectively implement the interference fit between the sealing element and the partition plate 12 and ensure a high sealing effect and reliability.

In an embodiment of this application, as shown in FIG. 14 or FIG. 15, the blocking mechanism 122 may be any one of a cylinder, an elliptical cylinder, a sheet-like body, or a sphere.

In some embodiments, as shown in FIG. 14 to FIG. 16, the blocking mechanism 122 may be a sealing plug, and the blocking mechanism space 125 may be a sealing hole.

As shown in FIG. 15 to FIG. 16, the sealing plug is a spherical structure. The sealing plug is in interference fit with both a hole wall of the electrolyte solution guiding hole 121 and an inner wall of a communication port between the electrolyte solution guiding hole 121 and the sealing hole.

Figure 22:
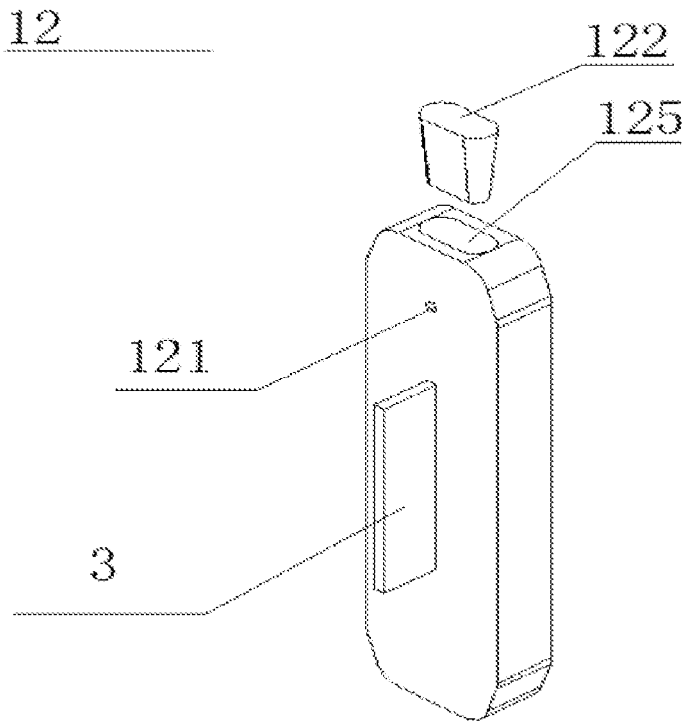
FIG. 22 is a structural exploded view of a partition plate according to another embodiment of this application.

Referring to FIG. 22, in some embodiments, the sealing plug is a wedge-shaped structure. A cross-sectional area of the sealing plug increases gradually in a direction from the first end to the second end of the sealing plug. The first end of the sealing plug is threaded through the sealing hole and accommodated in the electrolyte solution guiding hole 121 so that the electrolyte solution guiding hole 121 is in a closed state.

Specifically, the first end of the sealing plug is configured to extend into the sealing hole to close the electrolyte solution guiding hole 121. Specifically, the sealing plug is provided in the electrolyte solution guiding hole 121 after passing through the sealing hole so that the electrolyte solution guiding hole 121 is in a closed state. The second end of the sealing plug is provided on a side away from the electrolyte solution guiding hole 121.

Figure 23:
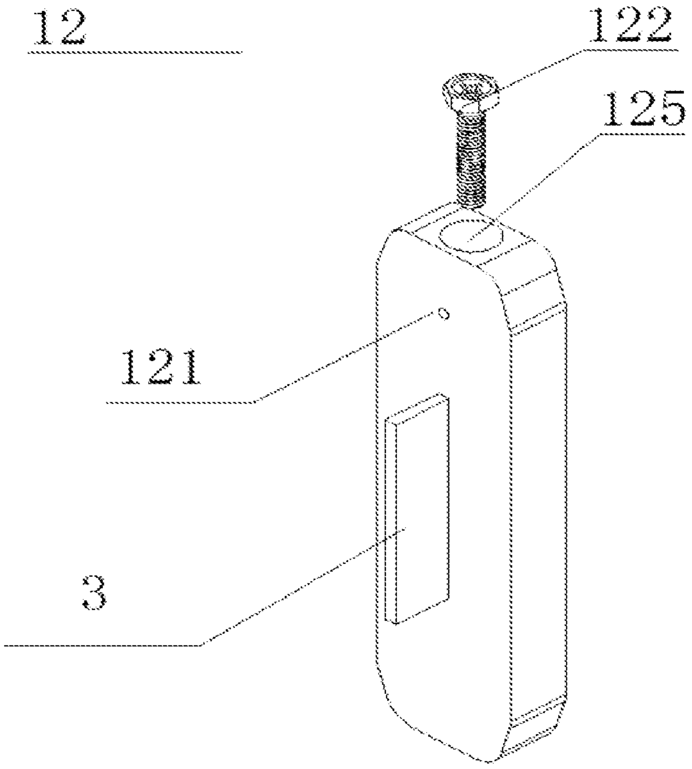
FIG. 23 is a structural exploded view of a partition plate according to still another embodiment of this application.

Referring to FIG. 23, the sealing plug is a screw structure and includes a head and a rod. The rod includes an external thread. The sealing hole includes an internal thread. The rod is connected to the sealing plug by threads. The rod is screwed into the electrolyte solution guiding hole so that the electrolyte solution guiding hole is in the closed state (that is, the rod is configured to fit the sealing hole threadedly to switch the electrolyte solution guiding hole 121 between the open state and the closed state).

The sealing plug is a cylindrical structure. The sealing plug includes an external thread, and the sealing hole includes an internal thread. The sealing plug is connected to the sealing hole by the threads.

In some embodiments, the sealing plug is connected and fixed to the sealing hole by snap-fitting. An elastic sealing ring is circumferentially arranged around the sealing plug. When the sealing plug passes through the sealing hole, the elastic sealing ring is in interference fit between the sealing plug and the sealing hole to implement sealing (that is, when the electrolyte solution guiding hole 121 is in the closed state, the elastic sealing ring is in interference fit with an inner wall of the sealing hole).

In some embodiments, the hole wall of the electrolyte solution guiding hole 121 at a preset position is recessed in a preset direction to form an electrolyte solution storage groove. The preset direction is a direction in which the battery 100 faces the ground after being mounted in an electric device, for example, a vehicle 1000, and put in normal use. The hole wall at the preset position is a hole wall that is of the electrolyte solution guiding hole 121 and that is close to the ground. Therefore, under extreme conditions, for example, when a tilt angle of the battery 100 is excessively large, even if a small amount of electrolyte solution flows into the electrolyte solution guiding hole 121, the small amount of electrolyte solution is just stored in the electrolyte solution storage groove, thereby preventing the electrolyte solution from flowing between adjacent electrode core assemblies 2 after passing through the electrolyte solution guiding hole 121, and in turn, avoiding short circuits and improving battery safety.

The accommodating cavity 11 accommodates the electrolyte solution. When the battery 100 is mounted in the electric device and put in normal use, the liquid level of the electrolyte solution is lower than the electrolyte solution guiding hole 121.

In some embodiments, sampling lines used to sample electrical parameters of the electrode core assembly 2 are arranged in the housing 1. The sampling lines may be plural in number. A plurality of the sampling lines are used to sample the electrical parameters of the electrode core assemblies 2 in the plurality of accommodating cavities 11 separately.

The electrical parameters may include at least one of voltage, current, and temperature. Abnormal states such as a short circuit and overcharge of the battery 100 can be determined based on the electrical parameters sampled by the sampling line.

In some embodiments, each sampling line is connected to a corresponding electrode lead-out member 22 of the electrode core assembly 2, and extends from an inner sidewall of the housing 1 to the end of the housing 1 after passing through the partition plate 12, so as to be electrically connectible to an external management unit through an end cover 13 arranged at the end of the housing 1.

Apparently, this application is not limited to the example given above. In other embodiments, each sampling line is connected to the corresponding electrode lead-out member 22 of the electrode core assembly 2, and, through an adjacent partition plate 12, and extends out of the housing 1 from a position that is of the housing 1 and that corresponds to the partition plate 12, so as to be electrically connectible to the external management unit.

It is to be understood that, all the sampling lines may extend to an electrical connection interface, and may be electrically connected to a plurality of pins in the electrical connection interface respectively and detachably connected to the external management unit through the electrical connection interface.

In an embodiment of this application, the length of the battery 100 extends along the first direction, and the first direction is the length direction of the battery 100.

Figure 24:
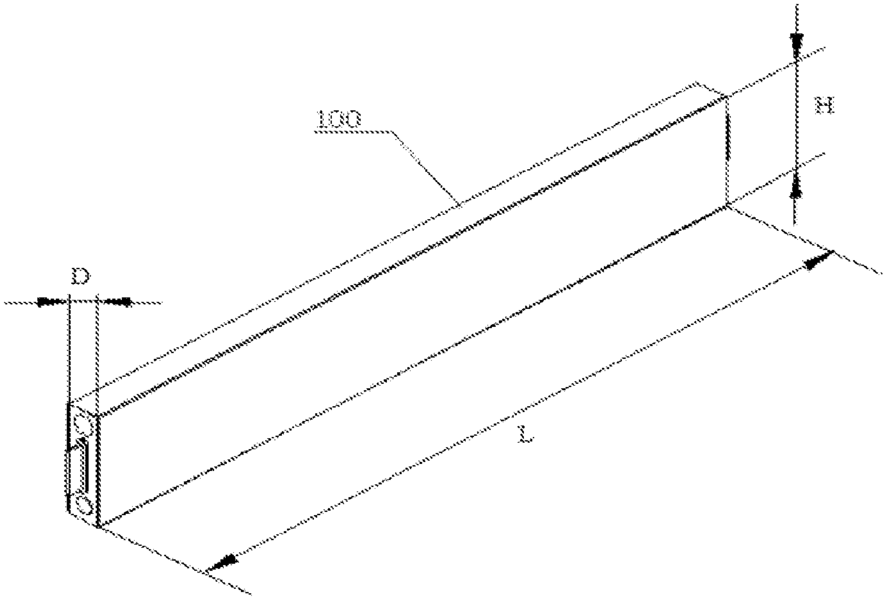
FIG. 24 is a schematic diagram of the overall structure of a battery according to an embodiment of this application.

As shown in FIG. 24, the battery 100 is approximately a cuboid. The battery 100 has a length L, a width H, and a thickness D. The length L is greater than the width H, and the width H is greater than the thickness D. The length of the battery 100 is 400 mm to 2500 mm. The length-to-width ratio of the battery 100 is 4 to 21.

It is to be noted that the battery being approximately a cuboid may be understood as: the battery may be a cuboid shape, a cube shape, or partially special-shaped, but roughly a cuboid or cube; or, may be approximately a cuboid and cube on the whole except that notches, bumps, chamfers, arcs, and bends exist in some regions of the battery.

As shown in FIG. 3, in the battery 100 according to this application, each electrode core 201 includes a tab 202. The electrode lead-out member 22 of the electrode core assembly 2 is formed by compounding and welding tabs 202 of the electrode cores 201 in the electrode core assembly 2. As shown in FIG. 15, the tab 202 of the electrode core 201 may be connected to an electrode core connector 3. For example, the tab and the electrode core connector may be stacked and welded to form a power connection region 203.

As shown in FIG. 16, in an embodiment of this application, the blocking mechanism 122 is a metal ball 1222 with a rubber sleeve 1221. In this solution, the metal ball 1222 ensures high strength of sealing, and the rubber sleeve 1221 improves airtightness.

In a specific embodiment of this application, the electrode lead-out member 22 of each electrode core assembly 2 includes the first electrode lead-out member and the second electrode lead-out member that are configured to leading out a current. The first electrode lead-out member and the second electrode lead-out member of at least one electrode core assembly 2 are arranged on two opposite sides of the electrode core assembly 2 respectively along the first direction. The length direction of the electrode core assembly 2 extends along the first direction. The first electrode lead-out member and the second electrode lead-out member may be lead-out pieces formed by compounding and welding tabs of the electrode cores 201 in the electrode core assembly 2.

The battery 100 according to this application may be a lithium-ion battery.

Figure 25:
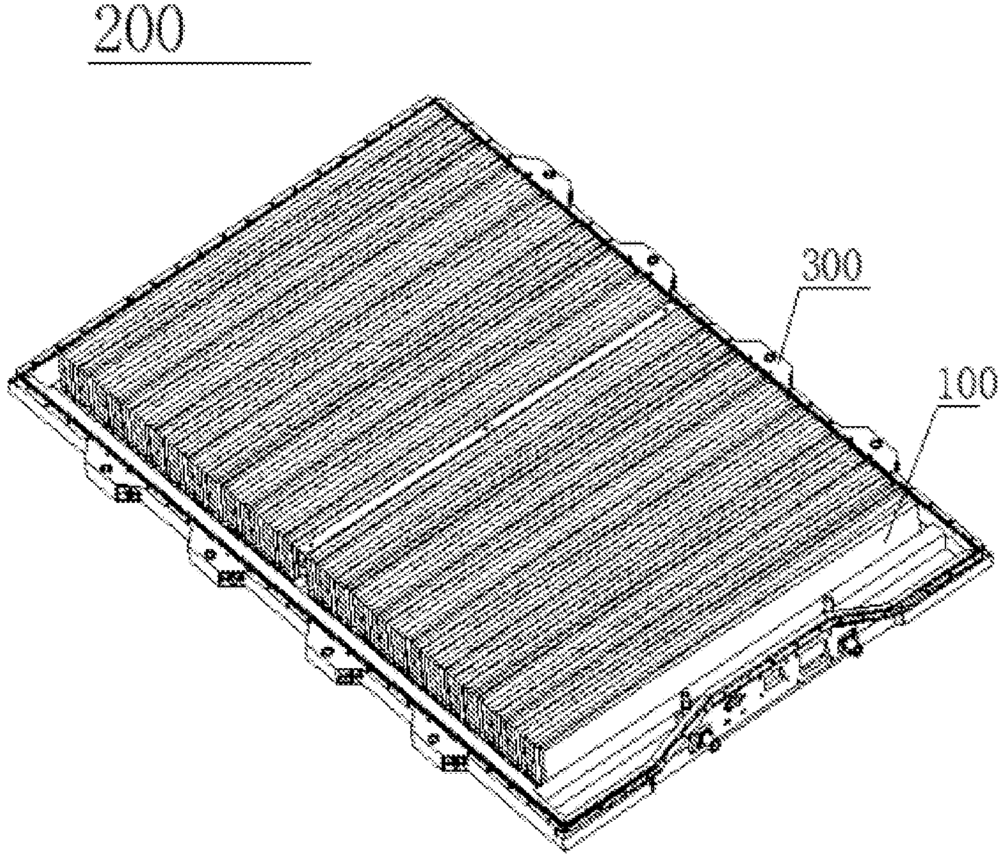
FIG. 25 is a schematic structural diagram of a battery pack according to an embodiment of this application.

Referring to FIG. 25, the battery pack 200 according to this application includes a tray 300 and the batteries 100 arranged in the tray 300.

In an embodiment of this application, the housing 1 is a metal housing 1. For example, the metal housing is an aluminum housing. Apparently, the housing may be made of other metals instead as required.

Figure 27:
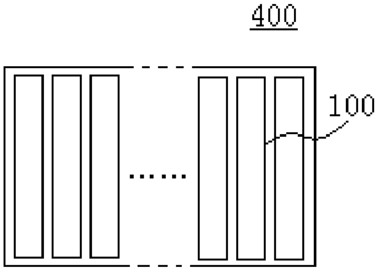
FIG. 27 is a schematic diagram of a battery module according to an embodiment of this application.

As shown in FIG. 27, this application further provides a battery module 400, including a plurality of batteries 100 according to this application.

Figure 26:
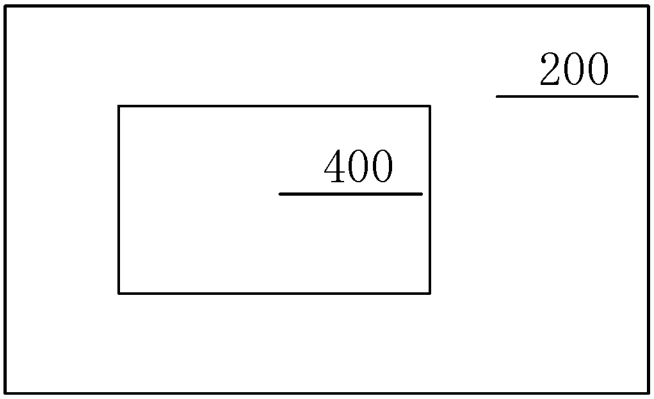
FIG. 26 is a schematic structural diagram of a battery pack according to another embodiment of this application.

As shown in FIG. 25 and FIG. 26, this application further provides a battery pack 200, including a plurality of batteries 100 or battery modules 400 according to this application.

Figure 28:
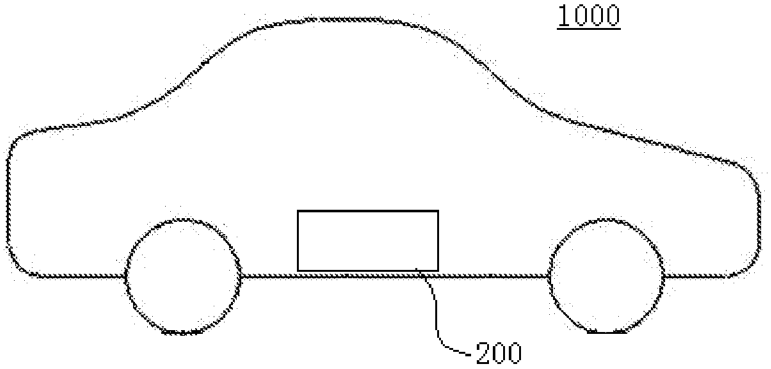
FIG. 28 is a schematic diagram of a vehicle according to an embodiment of this application.
Figure 29:
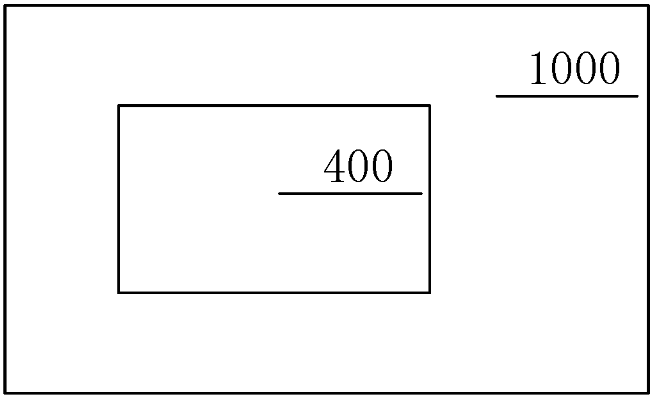
FIG. 29 is a schematic diagram of a vehicle according to another embodiment of this application.

As shown in FIG. 28 and FIG. 29, this application further provides a vehicle 1000, including the battery module 400 or battery pack 200 according to this application.

As can be seen from above, this application achieves the foregoing merits, and is practically applicable and gives rise to a highly practical product by virtue of efficacy that is lacking in the related art. Although the embodiments of this application are shown and described above, a person of ordinary skill in the art understands that variations, modifications, substitutions, and derivations may be made to the embodiments without departing from the principles and concept of this application. The scope of this application is subject to the claims and equivalents thereof.

What is claimed is:

1. A battery, comprising:

a housing and a plurality of accommodating cavities provided in the housing, wherein two adjacent accommodating cavities of the plurality of accommodating cavities are separated by a partition plate;

a plurality of electrode core assemblies sequentially arranged along a first direction and connected in series, wherein one electrode core assembly of the plurality of electrode core assemblies is arranged in each of the accommodating cavities; and a first spacer disposed within the housing and arranged between an end of a first electrode core assembly of the plurality of electrode core assemblies disposed in one of the two adjacent accommodating cavities and the partition plate; and a blocking mechanism;

wherein the partition plate is an insulation plate, wherein an electrolyte solution guiding hole is arranged in the partition plate, and the electrolyte solution guiding hole penetrates the partition plate and is configured to link the two adjacent accommodating cavities on two sides of the partition plate;

wherein the electrolyte solution guiding hole is configured to allow passage of an electrolyte solution between the two adjacent accommodating cavities when filling the electrolyte solution into the battery; and wherein the blocking mechanism is configured to close the electrolyte solution guiding hole after electrolyte solution filling or during normal use of the battery.

2. The battery according to claim 1, wherein the battery further comprises an end cover, wherein the end cover fits at an end of the housing along the first direction, and a second spacer is arranged between an end of a second electrode core assembly disposed at an end of the plurality of electrode core assemblies and the end cover.

3. The battery according to claim 1, wherein the battery comprises two first spacers, including the first spacer, respectively arranged at two ends of the first electrode core assembly along the first direction, and the two first spacers limit the first electrode core assembly along the first direction to a position inside the one of the two adjacent accommodating cavities.

4. The battery according to claim 1, wherein the housing is an integrated structure extending along the first direction, a plurality of partition plates including the partition plate are arranged in the housing at intervals, a lateral surface of the partition plate fits with the housing, and an internal space of the housing is divided into the plurality of accommodating cavities.

5. The battery according to claim 1, comprising a plurality of partition plates including the partition plate, wherein the housing comprises a plurality of sub-housings arranged along the first direction, and a respective partition plate is connected to two adjacent sub-housings.

6. The battery according to claim 1, wherein the housing is an integrated structure extending along the first direction, a cell core assembly is arranged in the housing, the cell core assembly comprises a separator film and the partition plate, an accommodating cavity of the plurality of accommodating cavities is provided inside the separator film, the partition plate is arranged within the separator film, and a lateral surface of the partition plate fits with the separator film, and an internal space of the separator film is divided into the plurality of accommodating cavities.

7. The battery according to claim 1, comprising a plurality of partition plates including the partition plate, wherein the housing is an integrated structure extending along the first direction, a cell core assembly is arranged in the housing, the cell core assembly comprises a separator film and the partition plate, an accommodating cavity of the plurality of accommodating cavities is provided inside the separator film, the separator film comprises a plurality of sub-separator films arranged along the first direction, and a respective partition plate is connected to two adjacent sub-separator films.

8. The battery according to claim 1, wherein one side of the first spacer abuts against an end of the first electrode core assembly, and the other side of the first spacer abuts against or is fixed to the partition plate.

9. The battery according to claim 1, wherein the first spacer includes a through-hole facing the partition plate and configured to accommodate a lead-out member of the first electrode core assembly.

10. The battery according to claim 9, wherein the through-hole runs through a middle portion of the first spacer.

11. The battery according to claim 9, wherein the first spacer comprises a first spacer portion that comprises a first groove, and a second spacer portion that comprises a second groove, wherein the first spacer portion fits in with and is fixed to the second spacer portion, and the first groove and the second groove are directly opposite to each other to form the through-hole.

12. The battery according to claim 11, wherein each of the first spacer portion and the second spacer portion comprises a fitting surface, wherein an opening of the first groove is made on the fitting surface of the first spacer portion, an opening of the second groove is made on the fitting surface of the second spacer portion, the fitting surface of the first spacer portion and the fitting surface of the second spacer portion are directly opposite to each other, and the fitting surface of the first spacer portion fits, or is spaced apart from, the second spacer portion, so that the first groove and the second groove form the through-hole.

13. The battery according to claim 12, wherein the first spacer portion is snap-fitted to the second spacer portion, a clasping hole is made in a non-grooved region of the fitting surface of the first spacer portion, a clasping stud is arranged in a non-grooved region of the fitting surface of the second spacer portion, and extends in a direction away from the fitting surface of the second spacer portion, and the clasping stud is configured to clasp and be fixed into the clasping hole.

14. The battery according to claim 9, wherein the battery further comprises an electrode core connector, wherein the electrode core connector is arranged in the partition plate, the first electrode core assembly and a second electrode core assembly respectively disposed in the two adjacent accommodating cavities are connected in series by the electrode core connector, and the lead-out member of the first electrode core assembly runs through the through-hole of the first spacer and is electrically connected to the electrode core connector.

15. The battery according to claim 14, wherein a connecting through-hole is made on the partition plate, the electrode core connector is threaded in the connecting through-hole, a sealing structure is arranged in the connecting through-hole, and the sealing structure is configured to seal the electrode core connector in the connecting through-hole, and seal off the connecting through-hole.

16. The battery according to claim 14, wherein the electrode core connector and the partition plate are integrally formed.

17. The battery according to claim 1, wherein the battery further comprises a blocking mechanism space, the blocking mechanism is provided in the blocking mechanism space, a first position and a second position used to accommodate the blocking mechanism are formed in the blocking mechanism space, and, when the blocking mechanism is in the first position, the electrolyte solution guiding hole is in an open state, and, when the blocking mechanism is in the second position, the electrolyte solution guiding hole is in a closed state.

18. A battery module, comprising a plurality of batteries, each of the plurality of batteries is the battery according to claim 1.

19. A vehicle, comprising the battery module according to claim 18.

20. The battery according to claim 17, wherein the blocking mechanism is a threaded sealing plug, and the blocking mechanism space is a sealing hole.

21. The battery according to claim 1, wherein the blocking mechanism is a sealing element with a magnetic property, and the blocking mechanism is configured to close the electrolyte solution guiding hole under a force exerted on the blocking mechanism by an externally applied magnetic field.

* * * * *